US011818610B2

(12) United States Patent
Jang et al.

(10) Patent No.: US 11,818,610 B2
(45) Date of Patent: Nov. 14, 2023

(54) METHOD AND APPARATUS FOR INDICATING TWO-STEP RANDOM ACCESS PROCEDURE IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/828,699

(22) Filed: May 31, 2022

(65) Prior Publication Data
US 2022/0295357 A1  Sep. 15, 2022

Related U.S. Application Data

(63) Continuation of application No. 16/784,550, filed on Feb. 7, 2020, now abandoned.

(30) Foreign Application Priority Data

Feb. 8, 2019 (KR) .................. 10-2019-0014882

(51) Int. Cl.
*H04W 4/00* (2018.01)
*H04W 36/00* (2009.01)
*H04W 74/08* (2009.01)

(52) U.S. Cl.
CPC ... *H04W 36/0055* (2013.01); *H04W 74/0833* (2013.01)

(58) Field of Classification Search
CPC ......... H04W 36/0055; H04W 74/0833; H04W 36/0077; H04W 74/002; H04W 74/085
See application file for complete search history.

(56) References Cited

U.S. PATENT DOCUMENTS

| | | | |
|---|---|---|---|
| 2013/0028207 A1* | 1/2013 | Okubo | H04L 1/0031 370/329 |
| 2014/0022981 A1* | 1/2014 | Kim | H04W 36/08 370/315 |
| 2016/0037409 A1 | 2/2016 | Jeong et al. | |
| 2018/0192335 A1 | 7/2018 | Bontu et al. | |
| 2018/0317264 A1 | 11/2018 | Agiwal et al. | |
| 2018/0332520 A1* | 11/2018 | Cheng | H04W 36/0016 |
| 2020/0092768 A1* | 3/2020 | Amuru | H04W 36/0072 |
| 2020/0205050 A1 | 6/2020 | Shah et al. | |
| 2020/0236704 A1* | 7/2020 | Chande | H04W 74/004 |

(Continued)

FOREIGN PATENT DOCUMENTS

| | | |
|---|---|---|
| WO | 2018/085726 A1 | 5/2018 |
| WO | 2019/001854 A1 | 1/2019 |

(Continued)

OTHER PUBLICATIONS

Indian Office Action dated Jan. 6, 2023, issued in Indian Application No. 202137035507.

(Continued)

*Primary Examiner* — Thai D Hoang
(74) *Attorney, Agent, or Firm* — Jefferson IP Law, LLP

(57) ABSTRACT

The disclosure relates to a communication technique for convergence of a fifth-generation (5G) or pre-5G communication system for supporting a higher data transmission rate beyond a fourth-generation (4G) communication system, such as Long-Term Evolution (LTE), with an IoT technology, and a system therefor. The disclosure may be applied to an intelligent service (for example, smart home, smart building, smart city, smart car or connected car, health care, digital education, retail business, security and safety-related service, etc.) on the basis of a 5G communication technology and an IoT-related technology. A method and an apparatus is provided for applying two-step random access when 3rd generation partnership project (3GPP) 5G new radio (NR) technology is used in an unlicensed band.

20 Claims, 18 Drawing Sheets

(56) References Cited

U.S. PATENT DOCUMENTS

| | | | | |
|---|---|---|---|---|
| 2021/0029743 A1* | 1/2021 | Lei | ................... | H04W 74/0833 |
| 2021/0168862 A1* | 6/2021 | Murray | ............... | H04W 74/002 |
| 2021/0288753 A1* | 9/2021 | Dai | ....................... | H04L 5/0096 |
| 2021/0289410 A1* | 9/2021 | Dai | ....................... | H04W 36/08 |
| 2022/0225453 A1* | 7/2022 | Kim | ..................... | H04W 76/20 |
| 2023/0116886 A1* | 4/2023 | Kim | ..................... | H04W 16/18 |
| | | | | 370/328 |

FOREIGN PATENT DOCUMENTS

| | | | | |
|---|---|---|---|---|
| WO | WO-2020150658 A1 * | 7/2020 | .......... | H04W 52/146 |
| WO | WO-2020223731 A1 * | 11/2020 | .......... | H04W 52/146 |
| WO | WO-2020247797 A1 * | 12/2020 | ........... | H04L 1/0061 |

OTHER PUBLICATIONS

Ericsson, Condition for Reconfiguration with sync at RRCSetup, R2-1818461, 3GPP TSG-RAN WG2#104, Nov. 12, 2018, Spokane, USA, XP051557949.

Huawei et al, Two-step RACH procedure for NR-U, R2-1811937, 3GPP TSG-RAN WG2 Meeting #103, Aug. 10, 2018, Gothenburg, Sweden, XP051521567.

Interdigital Communications, 2-step random access procedure, R1-1700703, 3GPP TSG RAN WG1 AH_NR Meeting, Jan. 16, 2017, Spokane, USA, XP051208227.

European Search Report dated Feb. 10, 2022, issued in European Application No. 20751948.9.

International Search Report dated May 18, 2020, issued in International Application No. PCT/KR2020/001811.

* cited by examiner

METHOD AND APPARATUS FOR INDICATING TWO-STEP RANDOM ACCESS PROCEDURE IN WIRELESS COMMUNICATION SYSTEM

CROSS-REFERENCE TO RELATED APPLICATION(S)

This application is a continuation application of prior application Ser. No. 16/784,550, filed on Feb. 7, 2020, which is based on and claims priority under 35 U.S.C. § 119(a) of a Korean patent application number 10-2019-0014882, filed on Feb. 8, 2019, in the Korean Intellectual Property Office, the disclosure of which is incorporated by reference herein in its entirety.

BACKGROUND

1. Field

The disclosure relates to a method for applying two-step random access in a wireless communication system, specifically when 3rd generation partnership project (3GPP) 5th generation (5G) new radio (NR) technology is used in an unlicensed band. More particularly, the disclosure relates to an apparatus for applying two-step random access in a wireless communication system, specifically when 3GPP 5G new radio (NR) technology is used in an unlicensed band.

2. Description of Related Art

In order to meet wireless data traffic demands that have increased after 4th generation (4G) communication system commercialization, efforts to develop an improved 5G communication system or a pre-5G communication system have been made. For this reason, the 5G communication system or the pre-5G communication system is called a beyond 4G network communication system or a post long-term evolution (LTE) system.

In order to achieve a high data transmission rate, an implementation of the 5G communication system in a mmWave band (for example, 60 GHz band) is being considered. In the 5G communication system, technologies such as beamforming, massive multiple-input and multiple-output (MIMO), Full Dimensional MIMO (FD-MIMO), array antenna, analog beam-forming, and large-scale antenna technologies are being discussed as means to mitigate a propagation path loss in the ultrahigh-frequency band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

In a 5G system, supporting of more various services is being considered compared to the 4G system of the related art. For example, most representative services may be a ultra wide band mobile communication service (enhanced mobile broad band (eMBB)), a ultra-reliable and low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in contrast to the existing 4G system requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating scheme employing the same are now under consideration.

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the Information Technology (IT) of the related art and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for reducing a collision due to contention when two-step random access is applied in an unlicensed band.

Another aspect of the disclosure is to provide an apparatus for reducing a collision due to contention when two-step random access is applied in an unlicensed band.

The technical subjects pursued in the disclosure may not be limited to the above mentioned technical subjects, and other technical subjects which are not mentioned may be clearly understood, through the following descriptions, by those skilled in the art of the disclosure.

Additional aspects will be set forth in part in the description which follows and, in part, will be apparent from the description, or may be learned by practice of the presented embodiments In accordance with an aspect of the disclosure, a method for performing random access (RA) by a user equipment (UE) in a wireless communication system is provided. The method includes receiving a handover indication message including preamble indication information about the UE and RA resource information from a first base station, and transmitting a message A (Msg A) for a handover to a second base station, based on the preamble indication information about the UE and the RA resource information included in the handover indication message.

In accordance with another aspect of the disclosure, a method for a first base station in a wireless communication system is provided. The method includes generating a handover indication message including preamble indication information and RA resource information for a handover of a UE, and transmitting the generated handover indication message to the UE, the preamble indication information about the UE and the RA resource information included in the handover indication message being for transmitting a message A (Msg A) for the handover of the UE to a second base station.

In accordance with another aspect of the disclosure, a UE in a wireless communication system is provided. The UE includes a transceiver configured to transmit and receive a signal to and from a base station, and a processor configured to receive a handover indication message including preamble indication information about the UE and RA resource information from a first base station and to transmit a message A (Msg A) for a handover to a second base station, based on the preamble indication information about the UE and the RA resource information included in the handover indication message.

In accordance with another aspect of the disclosure, a first base station in a wireless communication system is provided. The first base station includes a transceiver configured to transmit and receive a signal to and from a UE, and a processor configured to generate a handover indication message including preamble indication information and RA resource information for a handover and to transmit the generated handover indication message to the UE, wherein the preamble indication information about the UE and the RA resource information included in the handover indication message is for transmitting a message A (Msg A) for the handover of the UE to a second base station.

According to an embodiment, it is possible to reduce a collision due to contention when two-step random access is applied in an unlicensed band, thereby increasing the success rate of random access and reducing a delay in random access.

According to an embodiment, it is possible to reduce a collision due to contention when two-step random access is applied in an unlicensed band, thereby increasing the success rate of random access and reducing a delay in random access.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in long-term evolution (LTE) and new radio (NR) standards, which are the latest standards among the existing communication standards defined by 3rd-generation partnership project (3GPP) organization. However, the disclosure is not limited by the terms and names, and may be equally applied to a system that is based on another standard. In particular, the disclosure may be applied to 3GPP NR (5th generation mobile communication standards).

Figure 1A:
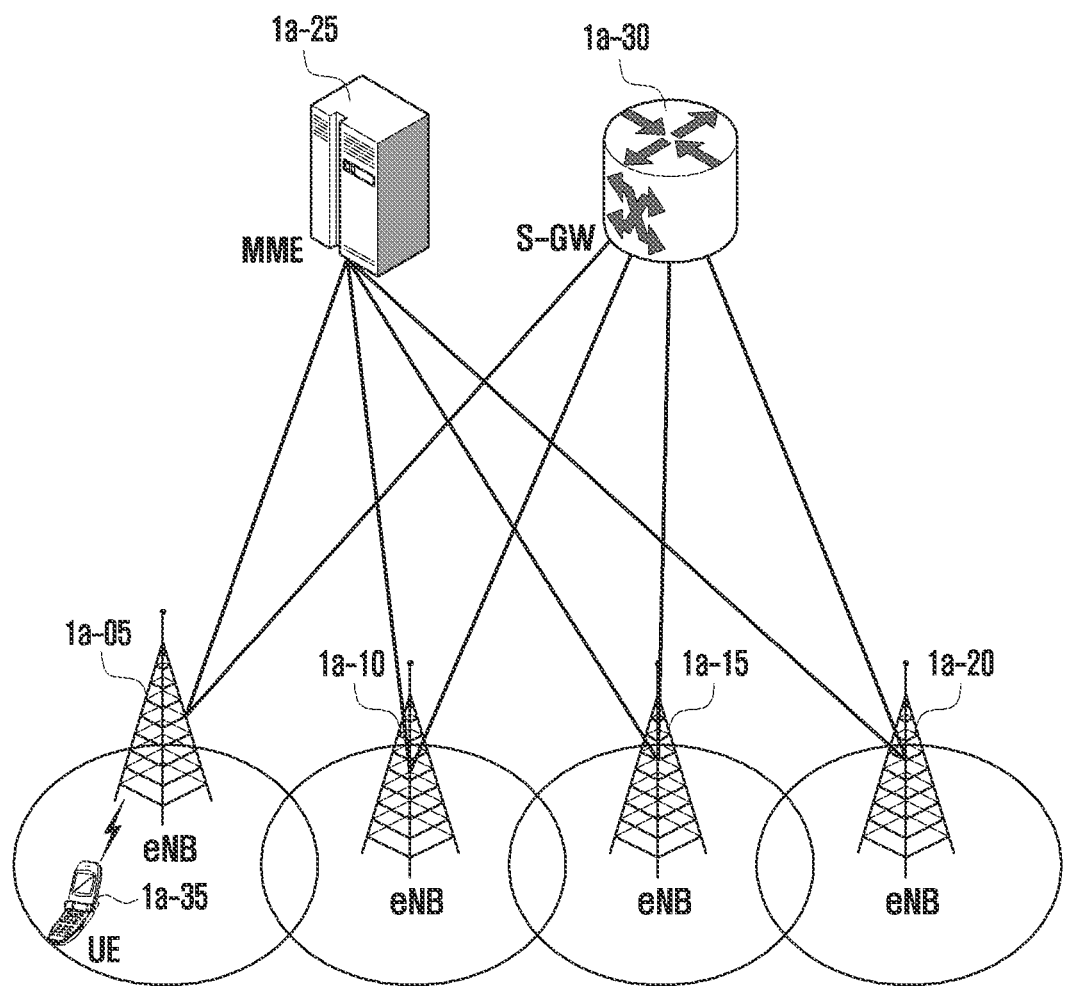
FIG. 1A illustrates the structure of a long-term evolution (LTE) system for reference to describe the disclosure according to an embodiment of the disclosure.

FIG. 1A illustrates the structure of an LTE system for reference to describe the disclosure according to an embodiment of the disclosure. An NR system also has substantially the same structure.

Referring to FIG. 1A, the wireless communication system includes a plurality of base stations 1a-05, 1a-10, 1a-15, and 1a-20, a mobility management entity (MME) 1a-25, and a serving-gateway (S-GW) 1a-30. A user equipment (hereinafter, "UE" or "terminal") 1a-35 is connected to an external network through the base stations 1a-05, 1a-10, 1a-15, and 1a-20 and the S-GW 1a-30.

The base stations 1a-05, 1a-10, 1a-15, and 1a-20 are access nodes of a cellular network and provide wireless connection for UEs connected to the network. That is, in order to serve traffic of users, the base stations 1a-05, 1a-10, 1a-15, and 1a-20 performs scheduling by collecting state information on UEs, such as a buffer state, an available transmission power state, and a channel state and supports connection between the UEs and a core network (CN). The MME 1a-25 is a device that performs not only a mobility management function for a UE but also various control functions and is connected to a plurality of base stations. The S-GW 1a-30 is a device that provides a data bearer. The MME 1a-25 and the S-GW 1a-30 may further perform authentication and bearer management for a UE connected to the network and processes a packet transmitted from the base stations 1a-05, 1a-10, 1a-15, and 1a-20 or a packet to be transmitted to the base stations 1a-05, 1a-10, 1a-15, and 1a-20.

Figure 1B:
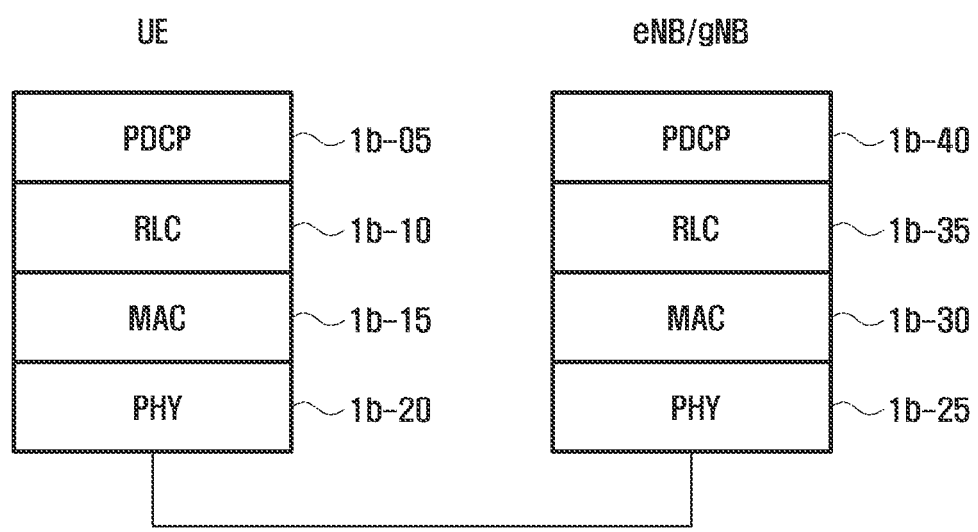
FIG. 1B illustrates the structure of wireless protocols for an LTE system and a new radio (NR) system for reference to describe the disclosure according to an embodiment of the disclosure.

FIG. 1B illustrates the structure of wireless protocols for an LTE system and an NR system for reference to describe the disclosure according to an embodiment of the disclosure.

Referring to FIG. 1B, the wireless protocols for the LTE system include a packet data convergence protocol (PDCP) 1b-05 and 1b-40, a radio link control (RLC) 1b-10 and 1b-35, and a medium access control (MAC) 1b-15 and 1b-30 for each of a UE and an eNB. The packet data convergence protocol (PDCP) 1b-05 and 1b-40 is responsible for IP header compression/decompression operations, and the radio link control (hereinafter, "RLC") 1b-10 and 1b-35 reconfigures a PDCP packet data unit (PDU) into an appropriate size. The MAC 1b-15 and 1b-30 is connected to a plurality of RLC layer devices configured in one UE, multiplexes RLC PDUs to an MAC PDU, and demultiplexes RLC PDUs from an MAC PDU. A physical layer 1b-20 and 1b-25 performs channel coding and modulation of upper-layer data and makes the upper-layer data into an orthogonal frequency-division multiplexing (OFDM) symbol to thereby transmit the OFDM symbol data via a radio channel or performs demodulation and channel decoding of an OFDM symbol received through a radio channel to thereby transmit the OFDM symbol to an upper layer. The physical layer also uses hybrid automatic repeat query (HARQ) for additional error correction, in which a reception terminal transmits one bit to indicate whether a packet transmitted from a transmission terminal is received. This is referred to as HARQ ACK/NACK information. In LTE, downlink HARQ ACK/NACK information in response to uplink data transmission may be transmitted through a physical channel, such as a physical hybrid-ARQ indicator channel (PHICH). In NR, it may be determined through scheduling information about the UE in a physical dedicated control channel (PDCCH), which is a channel for transmitting downlink/uplink resource allocation, whether downlink HARQ ACK/NACK information in response to uplink transmission needs retransmitting or is newly transmitted, because asynchronous HARQ is applied in NR. Uplink HARQ ACK/NACK information in response to downlink transmission may be transmitted through a physical channel, such as a physical uplink control channel (PUCCH) or physical uplink shared channel (PUSCH). The PUCCH is generally transmitted in an uplink of a PCell to be described. However, when a UE is supportive, a base station may additionally transmit the PUCCH to the UE in a SCell to be described, which is referred to as a PUCCH SCell.

Although not shown in the drawing, a radio resource control (RRC) layer exists above the PDCP layer of each of the UE and the base station. The RRC layer may exchange connection and measurement-related setup control messages for radio resource control.

The physical layer may include one frequency/carrier or a plurality of frequencies/carriers, and a technology of simultaneously configuring and using a plurality of frequencies is referred to as carrier aggregation (hereinafter, "CA"). In CA, instead of using one carrier, a main carrier and one additional subcarrier or a plurality of additional subcarriers are used for communication between a terminal (or UE) and a base station E-UTRAN NodeB (eNB), thereby dramatically increasing the transmission amount as much as the number of subcarriers. In LTE, a cell of a base station using a main carrier is referred to as a primary cell (PCell), and a cell using a subcarrier is referred to as a secondary cell (SCell).

Figure 1C:
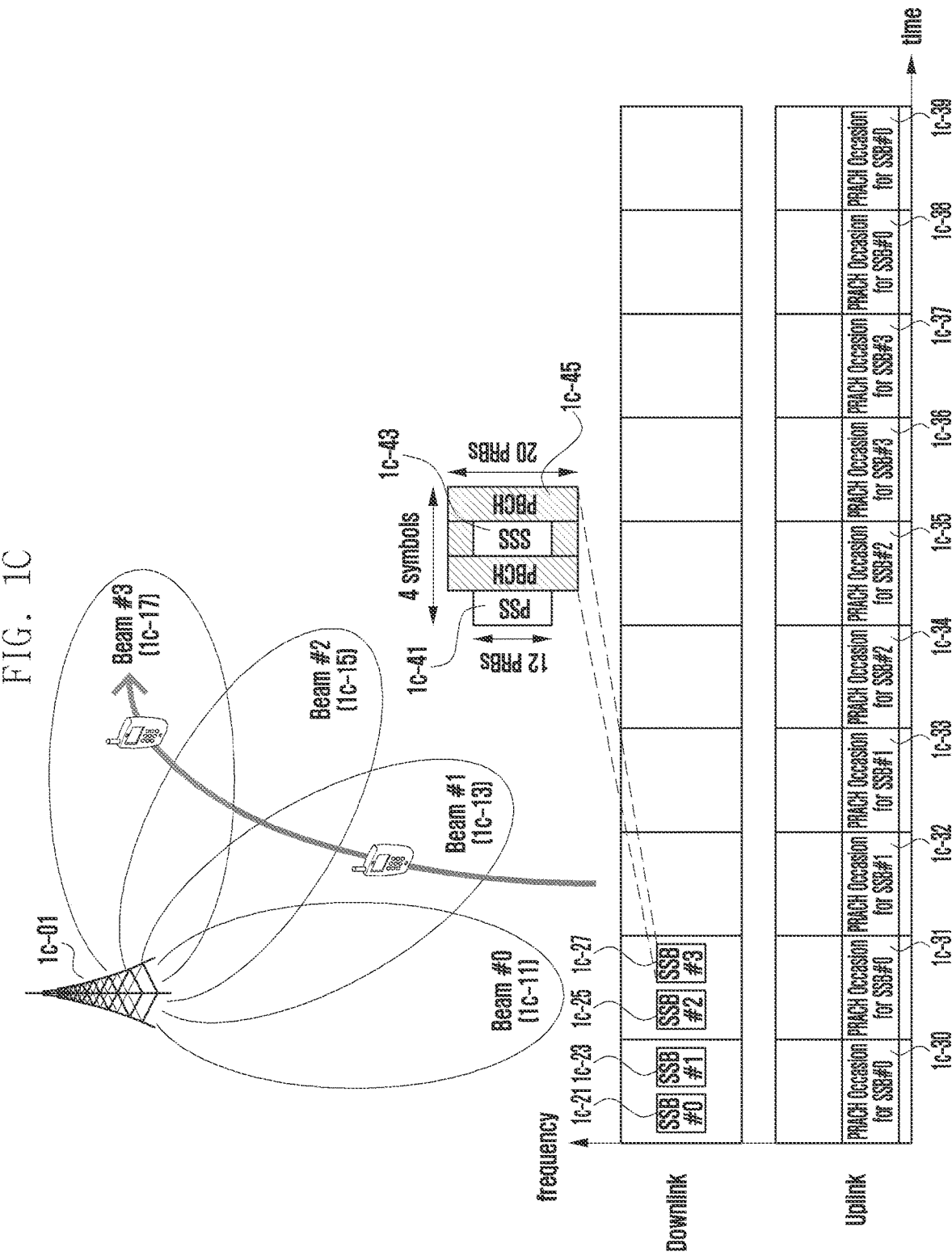
FIG. 1C illustrates the structure of downlink and uplink channel frames for beam-based communication in an NR system according to an embodiment of the disclosure.

FIG. 1C illustrates the structure of downlink and uplink channel frames for beam-based communication in an NR system according to an embodiment of the disclosure.

Referring to FIG. 1C, a base station 1c-01 transmits a signal in the form of a beam to increase coverage or to transmit a stronger signal (1c-11, 1c-13, 1c-15, and 1c-17). Accordingly, a UE 1c-03 in a cell needs to transmit and receive data using a particular beam (beam #1 1c-13 in this example) transmitted by the base station 1c-01.

The state of the UE 1c-03 is divided into an RRC_Integrated Development and Learning Environment (IDLE) state and an RRC_CONNECTED state depending on whether the UE 1c-03 is connected to the base station 1c-01. Thus, the base station 1c-01 does not know the position of the UE 1c-03 in the RRC_IDLE state.

When the UE 1c-03 in the RRC_IDLE state wishes to transition to the RRC_CONNECTED state, the UE 1c-03 receives synchronization signal blocks (SSBs) 1c-21, 1c-23, 1c-25, and 1c-27 transmitted by the base station 1c-01. The SSBs are SSB signals periodically transmitted according to a period set by the base station 1c-01, and each SSB is divided into a primary synchronization signal (PSS) 1c-41, a secondary synchronization signal (SSS) 1c-43, and a physical broadcast channel (PBCH) 1c-45.

In this illustrated drawing, it is assumed that an SSB is transmitted per beam. For example, it is assumed that SSB #0 1c-21 is transmitted using beam #0 1c-11, SSB #1 1c-23 is transmitted using beam #1 1c-13, SSB #2 1c-25 is transmitted using beam #2 1c-15, and SSB #3 1c-27 is transmitted using beam #3 1c-17. In this illustrated drawing, it is assumed that the UE 1c-03 in the RRC_IDLE state is positioned on beam #1 1c-13. However, even when the UE 1c-03 in the RRC_CONNECTED state performs random access, the UE 1c-03 selects an SSB received at the time of performing the random access.

Accordingly, in this drawing, the UE 1c-03 receives SSB #1 1c-23 transmitted via beam #1 1c-13. Upon receiving SSB #1 1c-23, the UE 1c-03 may obtain a physical cell identifier (PCI) of the base station 1c-01 through a PSS and an SSS and may identify the identifier (that is, #1) of the currently received SSB, a position where the current SSB is received in a 10-ms frame, and a system frame number (SFN) corresponding to the received SSB among SFNs a period of 10.24 seconds through a PBCH. Further, the PBCH includes a master information block (MIB), and the MIB indicates a position for receiving system information block type 1 (SIB1) broadcasting detailed configuration information about the cell. Upon receiving SIB1, the UE 1c-03 may know the total number of SSBs transmitted by the base station 1c-01 and may identify the position (1c-30 to 1c-39 assuming that allocation is performed every 1 ms in this illustrated drawing) of a physical random access channel (PRACH) occasion for performing random access to transition to the RRC_CONNECTED state (specifically for transmitting a preamble as a physical signal specially designed for uplink synchronization). In addition, the UE 1c-03 may identify which PRACH occasions among the PRACH occasions is mapped to which SSB index based on this information. For example, in this illustrated drawing, it is assumed that allocation is performed every 1 ms and that a ½ SSB per PRACH occasion (that is, two PRACH occasions per SSB) is allocated. Accordingly, two PRACH occasions are allocated for each SSB from the start of a PRACH occasion starting according to the SFN. That is, 1c-30 and 1c-31 are allocated for SSB #0 1c-21, 1c-32 and 1c-33 are allocated for SSB #1 1c-23, and the like. After configuring PRACH occasions for all the SSBs, PRACH occasions are allocated again for the first SSB (1c-38 and 1c-39).

Accordingly, the UE 1c-03 recognizes the positions of the PRACH occasions 1c-32 and 1c-33 for SSB #1 1c-23 and transmits a random access preamble via the earliest PRACH occasion (for example, 1c-32) of the PRACH occasions 1c-32 and 1c-33 corresponding to SSB #1 1c-23. Since receiving the preamble in the PRACH occasion 1c-32, the base station 1c-01 can recognize that the UE 1c-03 has selected SSB #1 1c-23 to transmit the preamble and accordingly transmits and receives data through the corresponding beam in subsequent random access.

When the UE 1c-03 in the RRC_CONNECTED state moves from a current (source) base station to a destination (target) base station due to a handover or the like, the UE 1c-03 performs random access in the target base station and performs an operation of selecting an SSB and transmitting a random access preamble. In a handover, a handover command is transmitted to the UE 1c-03 to move from the source base station to the target base station. In this message, a random access preamble index dedicated to the UE may be allocated per SSB of the target base station so as to be used when performing random access in the target base station. In this case, the base station may not allocate a dedicated random access preamble index for all beams (depending on the current position of the UE or the like), and thus some SSBs may not be allocated a dedicated random access preamble (for example, a dedicated random access preamble is allocated only to beam #2 and beam #3). When an SSB selected by the UE 1c-03 for preamble transmission is not allocated a dedicated random access preamble, the UE randomly selects a contention-based random access preamble to perform random access. For example, referring to this drawing, after initially performing random access at beam #1 1c-13 but failing, the UE 1c-03 may transmit a dedicated preamble at beam #3 1c-17 when transmitting a random access preamble again. That is, even in one random access procedure, when preamble retransmission is performed, a contention-based random access procedure and a contention-free random access procedure may be mixed according to whether a dedicated random access preamble is allocated in a selected SSB for each preamble transmission.

Figure 1D:
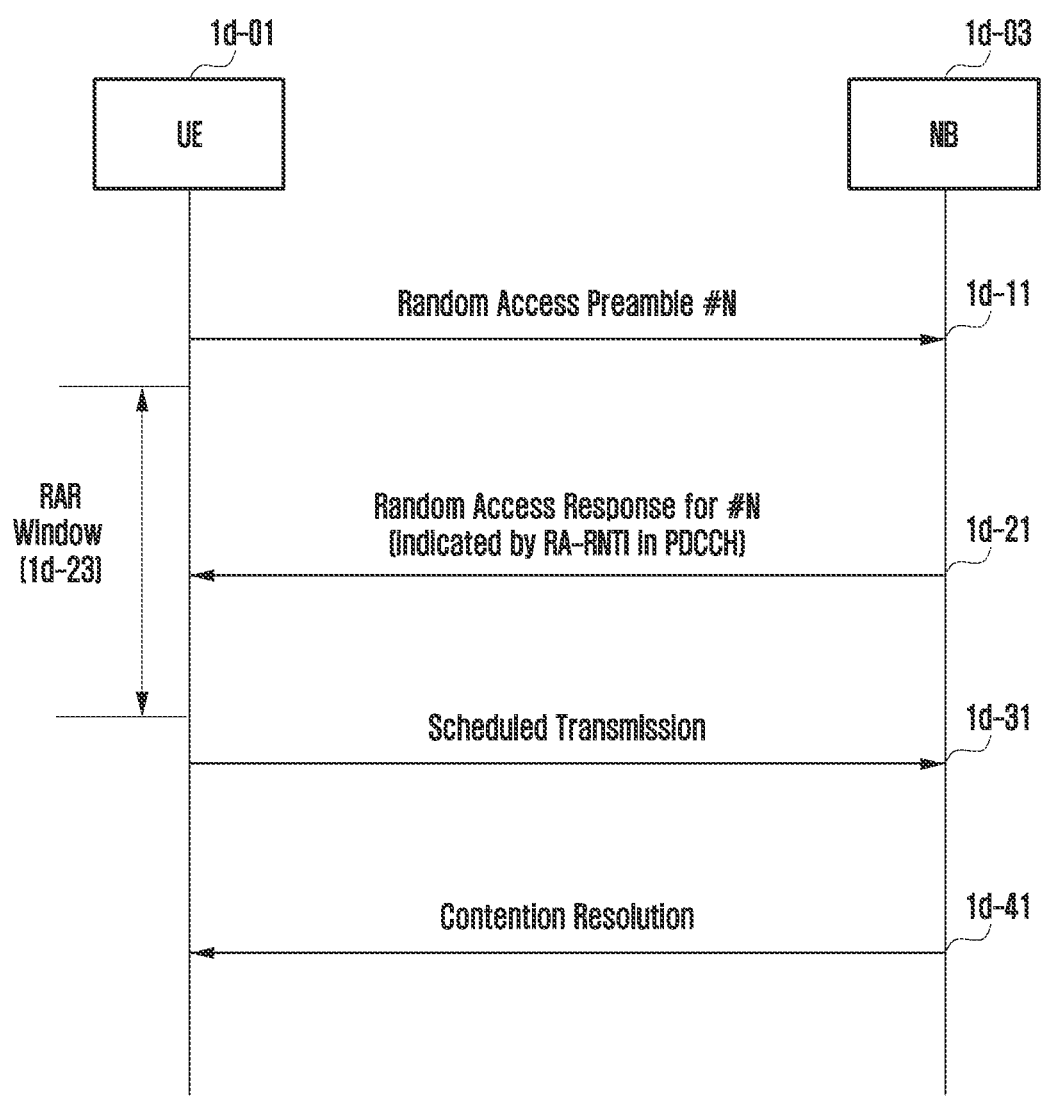
FIG. 1D illustrates a procedure in which a user equipment (UE) performs contention-based four-step random access to a base station according to an embodiment of the disclosure.

FIG. 1D illustrates a contention-based four-step random access procedure performed by a UE in initial connection to a base station, reconnection to a base station, a handover to a base station, or other cases where random access is required according to an embodiment of the disclosure.

Referring to FIG. 1D, for connection to a base station 1d-03, a UE 1d-01 selects a PRACH according to FIG. 1C and transmits a random access preamble via the PRACH (1d-11). One or more UEs may simultaneously transmit a random access preamble through the PRACH resource. The PRACH resource may span one subframe or may occupy only some symbols in one subframe. Information about the PRACH resource is included in system information broadcasted by the base station 1*d*-03 and indicates a time-frequency resource to be used to transmit a preamble. The random access preamble is a specific sequence specially designed to be received even though transmitted before synchronization with the base station 1*d*-03 is completely achieved, and may have a plurality of preamble indexes according to a standard. When there is a plurality of preamble indexes, the preamble transmitted by the UE 1*d*-01 may be a preamble randomly selected by the UE 1*d*-01 or may be a specific preamble designated by the base station 1*d*-03.

Upon receiving the preamble, the base station 1*d*-03 transmits a random access response (RAR) message to the UE 1*d*-01 in response (1*d*-21). The RAR message includes identifier information about the preamble used in operation 1*d*-11, uplink transmission timing correction information, allocation information about an uplink resource to be used in a subsequent operation (that is, operation 1*d*-31), and temporary UE identifier information. The identifier information about the preamble is transmitted to indicate to which preamble the RAR message is a response message, for example, when a plurality of UEs attempts random access by transmitting different preambles in operation 1*d*-11. The allocation information about the uplink resource is specific information about the resource to be used by the UE 1*d*-01 in operation 1*d*-31 and includes physical position and size of the resource, a modulation and coding scheme (MCS) used for transmission, power adjustment information for transmission, or the like. The temporary UE identifier information is a value transmitted for the case where the UE does not have an identifier allocated by the base station for communication with the base station when the UE transmits the preamble for initial connection.

The RAR message needs to be transmitted within a predetermined period starting after a predetermined time from the time the preamble is transmitted, and this period is referred to as an RAR window 1*d*-23. The RAR window starts after the predetermined time from the time the first preamble is transmitted. The predetermined time may have a subframe unit (1 ms) or shorter. The length of the RAR window may be a predetermined value set by the base station 1*d*-03 for each PRACH resource or for one or more PRACH resource sets in a system information message broadcast by the base station 1*d*-03.

When transmitting the RAR message, the base station 1*d*-03 schedules the RAR message through a PDCCH, and scheduling information is scrambled using a random access-radio network temporary identifier (RA-RNTI). The RA-RNTI is mapped to the PRACH resource used to transmit the message in operation 1*d*-11, and the UE 1*d*-01 having transmitted the preamble via the specific PRACH resource attempts to receive a PDCCH based on the RA-RNTI and determines whether there is a corresponding RAR message. That is, when the RAR message is a response to the preamble transmitted by the UE 1*d*-01 in operation 1*d*-11 as in the illustrated drawing, the RA-RNTI used for the scheduling information about the RAR message includes information about the transmission in operation 1*d*-11. The RA-RNTI may be calculated by the following equation:

$$RA\text{-}RNTI = 1 + s\_id + 14 \times t\_id + 14 \times 80 \times f\_id + 14 \times 80 \times 8 \times ul\_carrier\_id$$

where s_id is an index corresponding to the first OFDM symbol in which transmission of the preamble transmitted in operation 1*d*-11 starts and has a value satisfying 0≤s_id<14 (that is, the maximum number of OFDM symbols in one slot); t_id is an index corresponding to the first slot in which transmission of the preamble transmitted in operation 1*d*-11 starts and has a value satisfying 0≤t_id<80 (that is, the maximum number of slots in one system frame (10 ms)); the f_id indicates a PRACH resource used to transmit the preamble transmitted in operation 1*d*-11 on the frequency and has a value satisfying 0≤f_id<8 (that is, the maximum number of PRACHs on the frequency within the same time); and ul_carrier_id is a factor for distinguishing whether the preamble is transmitted in a normal uplink (NUL) (0 in this case) or in a supplementary uplink (SUL) (1 in this case) when two carriers are used in an uplink for one cell.

Upon receiving the RAR message, the UE 1*d*-01 transmits different messages via a resource allocated through the RAR message depending on the foregoing various purposes (1*d*-31). In this embodiment, the third transmitted message is also referred to as Msg3 (that is, the preamble in operation 1*d*-11 or 1*d*-13 is also referred to as Msg1, and the RAR in operation 1*d*-21 is also referred to as Msg2). As an example of Msg3 transmitted by the UE 1*d*-01, an RRCConnectionRequest message, which is a message of an RRC layer, is transmitted for initial connection, an RRCConnectionReestablishmentRequest message is transmitted for reconnection, and an RRCConnectionReconfigurationComplete message is transmitted for a handover. Further, a buffer status report (BSR) message for a resource request may be transmitted.

Subsequently, in initial transmission (that is, Msg3 does not include base station identifier information previously allocated to the UE 1*d*-01), the UE 1*d*-01 receives a contention resolution message from the base station 1*d*-03 (1*d*-41), and the contention resolution message includes the same information as transmitted by the UE 1*d*-01 via Msg3, thus indicating to which UE the response corresponds when there is a plurality of UEs selecting the same preamble in operation 1*d*-11 or 1*d*-13.

Figure 1E:
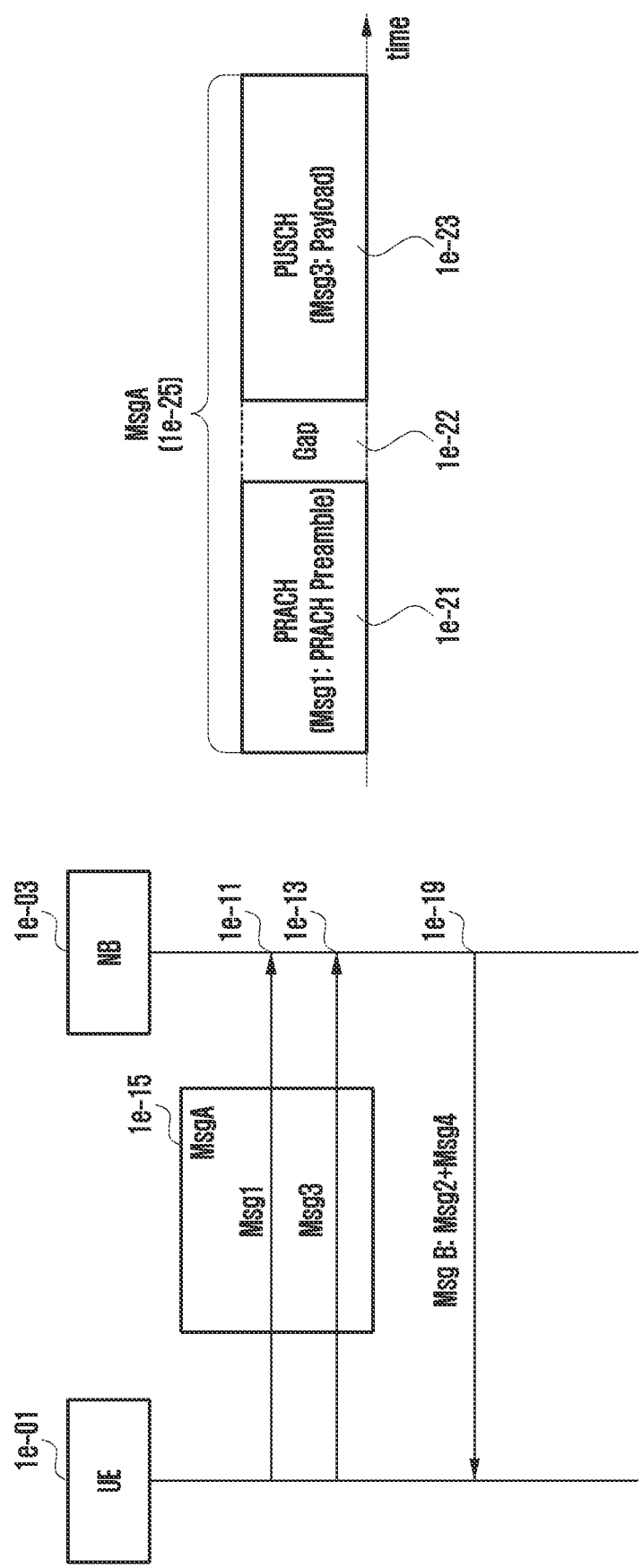
FIG. 1E illustrates a procedure in which a UE performs two-step random access to a base station according to an embodiment of the disclosure.

FIG. 1E illustrates a procedure in which a UE performs two-step random access to a base station according to an embodiment of the disclosure.

Referring to FIG. 1D, general contention-based random access involves at least four operations. If an error occurs in one operation, the procedure may be further delayed. Accordingly, it may be considered to reduce the random access procedure to a two-step procedure.

To this end, a UE 1*e*-01 may transmit MsgA 1*e*-25 of consecutively transmitting preambles Msg1 (1*e*-11 corresponding to 1*d*-11) and Msg3 (1*e*-13 corresponding to 1*d*-31) of a four-step random access procedure to a base station 1*e*-03 (1*e*-15), and the base station 1*e*-03 receiving MsgA may transmit MsgB 1*e*-19 including information of Msg2 (RAR corresponding to 1*d*-21) and Msg4 (corresponding to 1*d*-41) of the four-step random access procedure to the UE 2*e*-01, thereby reducing a random access procedure.

In this case, when shown in time, MsgA may include a PRACH resource 1*e*-21 for transmitting Msg1, a PUSCH resource 1*e*-23 for transmitting Msg3, and a gap resource 1*e*-22 for resolving interference that may occur in transmission via the PUSCH resource.

As described above in FIG. 1D, the UE 1*e*-01 performs random access for various purposes. For example, the UE 1*e*-01 may perform random access in order to transmit a message for connection when not yet connected to the base station 1*e*-03 or in order to transmit a message for recovering connection when disconnected from the base station 1*e*-03 due to an error, and these messages belong to a common control channel (CCCH). Control messages belonging to the CCCH include RRCSetupRequest (for transition from RRC_IDLE to RRC_CONNECTED), RRCResumeRequest (for transition from RRC_INACTIVE to RRC_CONNECTED), RRCReestablishmentRequest (for reestablishing connection), and RRCSystemInfoRequest (upon request for system information broadcast by the base station). When the UE 1e-01 performs the foregoing two-step random access in every CCCH transmission, a collision between messages may incur a serious delay in the random access procedure. Thus, random access may be performed only for a predetermined message among the messages belonging to the CCCH. For example, since RRCReestablishmentRequest transmitted for connection recovery or RRCResumeRequest used in transition from RRC_INACTIVE to RRC_CONNECTED is a high-priority message, two-step random access may be performed for these messages when random access is required. However, it may not matter if a delay occurs in RRCSystemInfoRequest, four-step random access described above may be performed to transmit this message instead of two-step random access. Alternatively, CCCH messages may be determined to have a higher priority than that of messages of other dedicated control channels and dedicated traffic channels, which will be described later, and may be transmitted using two-step random access.

When the UE 1e-01 is normally connected to the base station 1e-03, the UE 1e-01 may transmit and receive a message belonging to a dedicated control channel (DCCH) and a dedicated traffic channel (DTCH) in RRC_CONNECTED. For the message transmitted by the UE 1e-01, the UE 1e-01 needs to transmit a buffer status report (BSR) message indicating that the UE 1e-01 has data to transmit via an uplink to the base station 1e-03, thereby requesting uplink resource allocation. To this end, the base station 1e-03 may allocate a dedicated PUCCH resource for transmitting a scheduling request (SR) for a specific logical channel to the UE 1e-01. Accordingly, when receiving an SR from the UE 1e-01 via a PUCCH, the base station 1e-03 allocates an uplink resource for transmitting a BSR. When the UE 1e-01 transmits a BSR via the uplink resource, the base station 1e-03 may identify the buffer state of the UE 1e-01 and may allocate an uplink resource for data.

When the base station 1e-03 does not allocate the SR in the specific logical channel (a logical concept divided according to the type of control and normal data) or when the SR is allocated but an uplink resource is not allocated despite transmitting the SR as many times as the maximum number of SR transmissions, thus not transmitting a BSR, the UE 1e-01 may perform random access to transmit a BSR to the base station 1e-03 via Msg3.

Accordingly, when the UE 1e-01 is connected to the base station 1e-03 and then configures a logical channel for transmitting data belonging to each of a dedicated control channel (DCCH) and a dedicated traffic channel (DTCH), the UE 1e-01 may set whether two-step random access can be performed when performing random access for transmitting the logical channel. For example, the base station 1e-03 may configure two-step random access to be enabled for a logical channel for a DCCH (for example, control radio bearer 1, control radio bearer 2, and control radio bearer 3) and a logical channel for traffic having a high priority.

Accordingly, when the UE 1e-01 in the RRC_CONNECTED state performs random access, two-step random access may be performed or four-step random access may be performed depending on whether two-step random access is allowed for a logical channel triggering the random access.

Figure 1F:
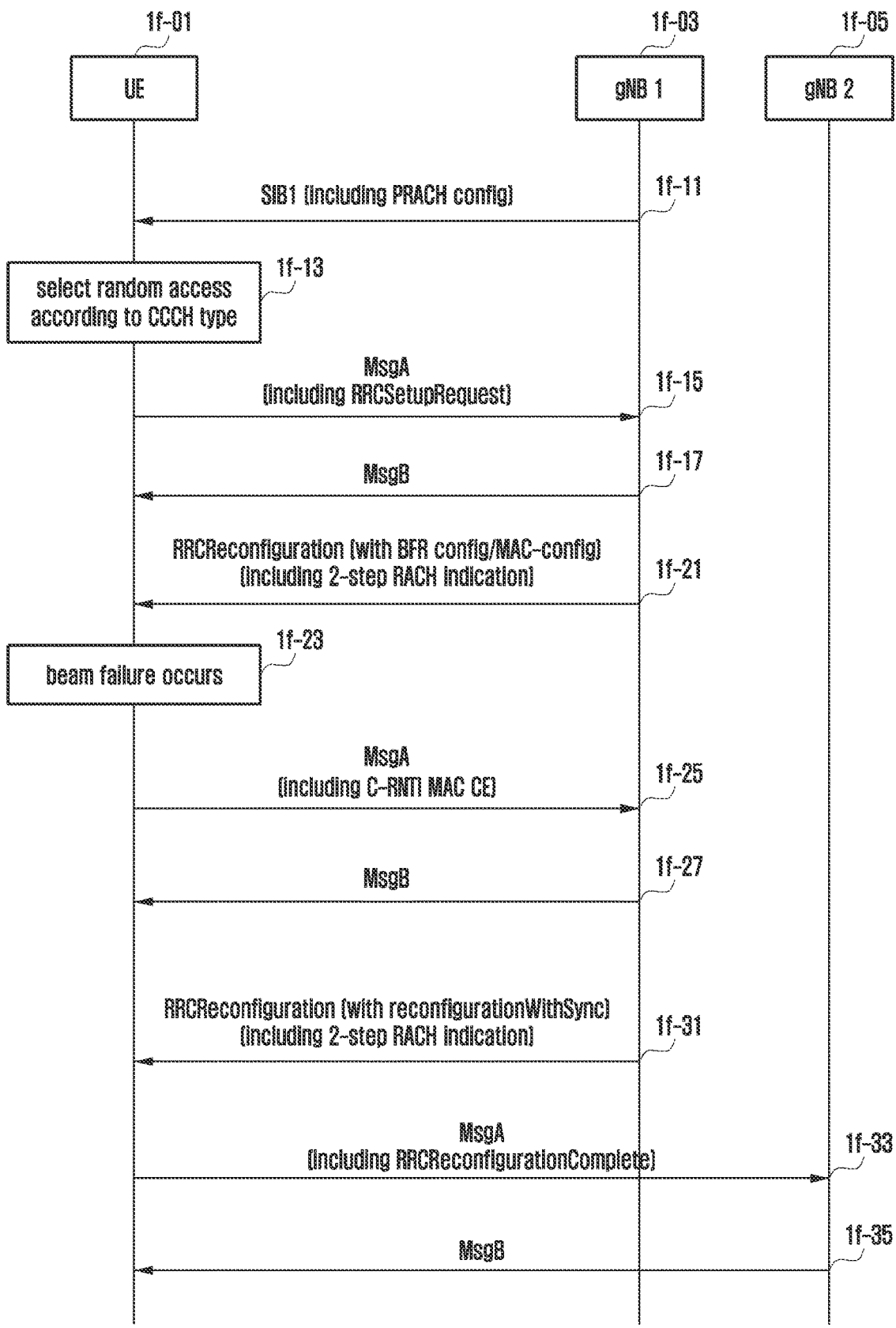
FIG. 1F illustrates a procedure in which a UE performs random access to a base station according to an embodiment of the disclosure.

FIG. 1F illustrates a procedure in which a UE performs random access to a base station according to an embodiment of the disclosure.

Referring to FIG. 1F, it is assumed that a UE 1f-01 is in the RRC_IDLE state. In the RRC_IDLE state, the UE 1f-01 cannot transmit or receive data but can select (or reselect) a specific base station/cell to camp on the cell and can periodically receive a paging message indicating the presence of downlink data from the cell.

When the UE 1f-01 in the RRC_IDLE state receives a paging message due to occurrence of downlink traffic or when uplink traffic occurs, the UE 1f-01 may transmit an RRCSetupRequest message to a base station 1f-03 in order to connect to the base station 1f-03, to establish a connection, and to transition to the RRC_CONNECTED state. The UE 1f-01 receives system information broadcast by a cell on which the UE 1f-01 is currently camping (1f-11). The system information may be transmitted, being divided into various messages according to the type of information transmitted by a SystemInformationBlock (SIB) message. For example, detailed configuration information about a PRACH of the cell is transmitted via SIB1, and configuration information for assisting UEs in the RRC_IDLE state in selecting neighboring cells may be transmitted via SIB2, SIB3, SIB4, and SIB5.

The detailed configuration information about the PRACH includes the resource positions and periods of a resource (PRACH information) for four-step random access and a resource (for example, resources for a PRACH, a GAP, and a PUSCH in FIG. 1E) for two-step random access and a modulation and coding scheme (MCS) used for transmission in the case of a PUSCH. In addition, since these resources can be used for CCCH transmission, information about which CCCH transmission the resources can be used may be included. For example, an indicator indicating which CCCH message the resource for two-step random access can be used to transmit among the aforementioned CCCHs (RRCSetupRequest, RRCResumeRequest, RRCReestablishmentRequest, and RRC SystemInfoRequest) may be included. Accordingly, the UE 1f-01 may determine whether to use a corresponding resource according to the type of a CCCH to be transmitted (1f-13).

Accordingly, when receiving SIB1 indicating that two-step random access is available for RRCSetupRequest transmission, the UE 1f-01 transmits MsgA including an RRCSetupRequest message to the base station 1f-03 (1f-15). When successfully receiving the message, the base station 1f-03 transmits MsgB to the UE 1f-01 in response (1f-17). When the UE 1f-01 successfully receives the message, a random access procedure successfully terminates.

The base station 1f-03 transmits an RRCSetup message to the UE 1f-01 at the same time as or after transmitting MsgB, and the UE 1f-01 transitions to the RRC_CONNECTED state and transmits an RRCSetupComplete message to the base station 1f-03 in response, thereby completing a connection procedure. Accordingly, the UE 1f-01 may transmit and receive data to and from the base station 1f-03.

Subsequently, the UE 1f-01 may receive more detailed configuration information from the base station 1f-03 (1f-21). This configuration information may be transmitted through an RRCReconfiguration message and may include, for example, configuration information related to beam failure recovery for quick recovery of a beam when a beam for transmission reception cannot be used due to a sudden movement of the UE 1f-01 or the like. The beam failure recovery may be performed by selecting a beam to be recovered after beam failure occurs and transmitting a random access preamble corresponding to the selected beam, and the configuration information may further indicate whether a two-step random access procedure is available for a beam failure recovery procedure when performing the recovery procedure.

In addition, when the UE 1f-01 needs to transmit uplink data, the UE 1f-01 may be configured to transmit a scheduling request (SR) signal via a PUCCH Resource per specific traffic type (or logical channel) in order to report a buffer status report (BSR). When an SR is configured in a logical channel triggering the BSR, if a resource is not allocated by the base station 1f-03 even though transmitting an SR signal as many times as a maximum transmission number, the UE 1f-01 performs random access. Further, when the SR is not configured in the logical channel triggering the BSR, the UE 1f-01 also performs random access. The configuration message may further indicate whether to perform two-step random access when the UE 1f-01 performs random access in the above scenario.

FIG. 1F shows a case where a beam failure occurs while the UE 1f-01 is communicating with the base station 1f-03 (1f-23) and the use of a two-step random access procedure is additionally indicated for quick recovery. Accordingly, the UE 1f-01 selects a beam available for communication in the current situation, selects a resource for transmitting a random access preamble corresponding to the beam, and transmits a preamble along with a MAC-layer message control element (CE) including an identifier of the UE 1f-01 performing this procedure to the base station 1f-03 through the resource (1f-25). Upon receiving the preamble, the base station 1f-03 transmits a response to the UE 1f-01, thereby terminating the beam failure recovery procedure (1f-27).

A scenario in which the UE 1f-01 may needs to change a connection to another base station 1f-05 due to a movement of the UE 1f-01 may be further considered. To this end, although not shown in this drawing, the current base station 1f-03 may configure a measurement for the UE 1f-01 to measure the neighboring base station 1f-05, and the UE 1f-01 reports a measurement result to the base station 1f-03 when a report condition is satisfied according to a measurement configuration. Accordingly, the current base station 1f-03 may determine to move the UE 1f-01 to one of reported base stations. When a base station is determined, the current base station 1f-03 transmits a handover request message to the target base station 1f-05, and the target base station 1f-05 transmits a handover acceptance message to the current base station 1f-03. The handover acceptance message includes various kinds of configuration information to be used by the UE 1f-01 in the target base station 1f-05. The current base station 1f-03 transmits these kinds of configuration information to the UE 1f-01, thus commanding the UE 1f-01 to hand over to the target base station 1f-05 (1f-31).

Not only in the foregoing scenario of changing a base station/cell but also in a scenario of adding/changing a secondary base station (cell group) when simultaneously using two base stations for one UE 1f-01 as in dual connectivity, an RRCReconfiguration message including an information element of reconfigurationWithSync may be transmitted to the UE 1f-01, thereby commanding the UE 1f-01 to perform a corresponding operation. Accordingly, in this example, a message may be transmitted to indicate a handover to the UE 1f-01 to instruct the handover (1f-31). Here, the UE 1f-01 needs to transmit an RRCReconfigurationComplete message to the target base station 1f-05 in order to indicate the completion of a handover. To this end, the UE 1f-01 needs to perform random access. Therefore, the target base station 1f-05 may allocate a dedicated two-step random access resource via a configuration message for indicating the handover so that the UE 1f-01 may transmit the RRCReconfigurationComplete message, which is for allocating the transmission resource only for the UE 1f-01, preventing a different UE from using the resource for transmission, thus quickly completing the handover without any collision. Accordingly, when the UE 1f-01 is allocated the dedicated two-step random access resource, the UE 1f-01 may transmit not only a preamble allocated in MsgA transmission but also the RRCReconfigurationComplete message to the target base station 1f-05 in operation 1f-33, thus completing a handover procedure. The UE 1f-01 may receive MsgB from the target base station 1f-05, thus completing a random access procedure in the target base station 1f-05 (1f-35).

In another example, in a handover or addition of an SCG, the target base station 1f-05 may allocate only a dedicated preamble to the UE 1f-01. In this case, the UE 1f-01 may transmit an RRCReconfigurationComplete message according to an existing random access procedure in which only a preamble is transmitted even though there is a two-step random access resource in the target base station 1f-05, and may use the two-step random access resource after the RRCReconfigurationComplete message is transmitted or after a timer T304 used to determine the completion of a handover expires or is suspended.

Figure 1G:
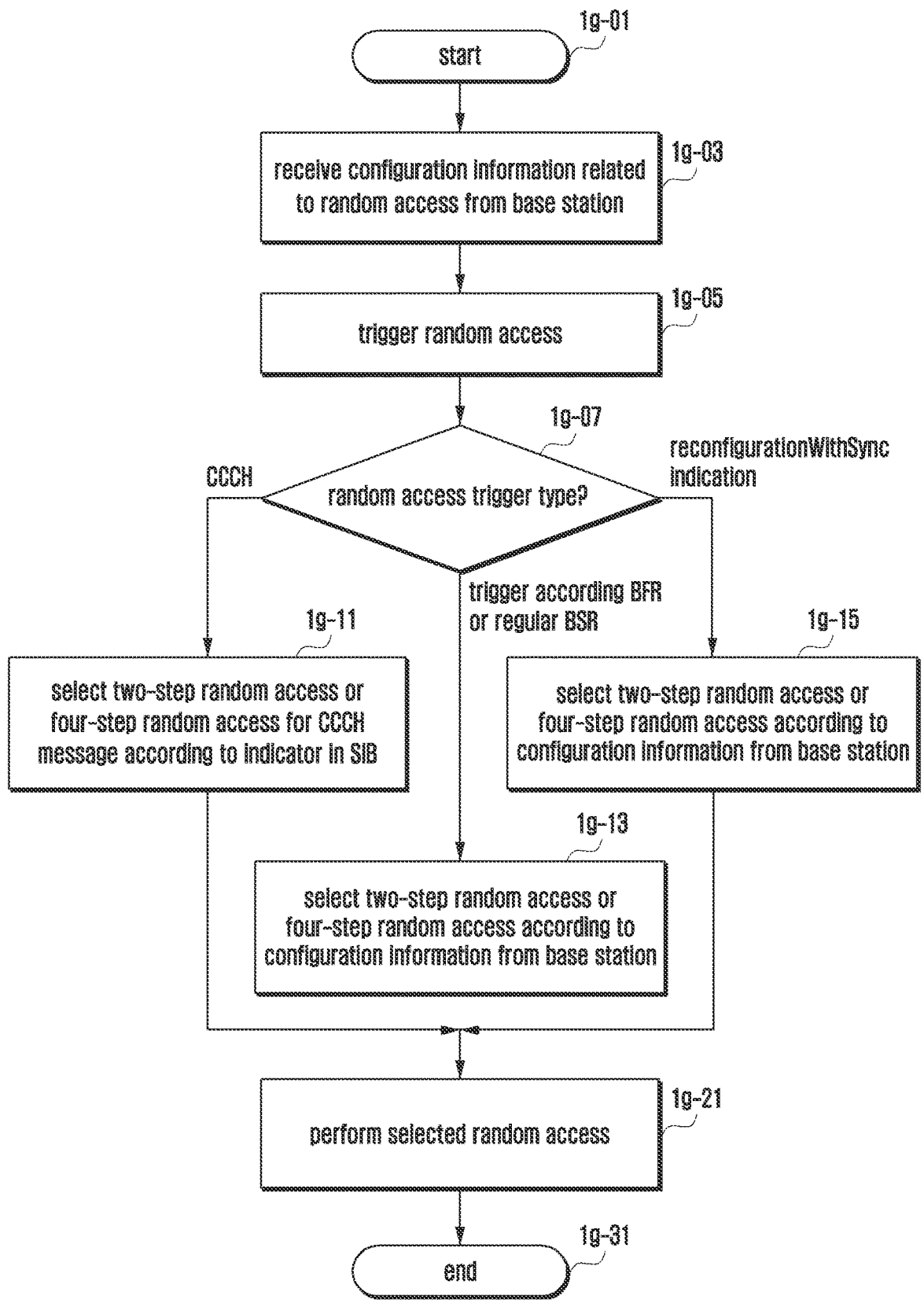
FIG. 1G illustrates an operation sequence in which a UE selects random access according to an embodiment of the disclosure.

FIG. 1G illustrates an operation sequence in which a UE selects random access according to an embodiment.

The UE receives configuration information related to random access from a base station (1g-03). The configuration information may be received via a system information block (SIB) message broadcast by the base station or may be received by the UE via a dedicated RRC message. For example, CCCH transmission-related information may be included in a SIB message. When random access is configured for each UE as in a handover, the configuration information may be received by the UE via a dedicated RRC message transmitted only to the UE.

Subsequently, the UE triggers a random access procedure (1g-05). The random access procedure may be triggered to transmit a CCCH for a transition from the RRC_IDLE state to the RRC_CONNECTED state as described in FIG. 1F, may be triggered for beam failure recovery, or may be triggered in handover/SCG addition scenarios.

When random access is triggered for CCCH transmission, the UE determines whether a resource for two-step random access is configured and the type of a CCCH to be transmitted for which two-step random access is allowed from information received from the base station (information received via an SIB) in operation 1g-07. Accordingly, when two-step random access is configured and is allowed according to the type of a CCCH to be transmitted by the UE, the UE performs two-step random access; otherwise, the UE performs four-step random access (1g-11 and 1g-21).

When the UE performs random access for beam failure recovery, the UE determines whether the base station configures whether a two-step random access procedure recovery procedure is available for a beam failure recovery procedure. When it is configured that a two-step random access procedure recovery procedure is available for a recovery procedure, the UE performs a beam failure recovery procedure using a two-step random access procedure; otherwise, the UE performs four-step random access (1g-13 and 1g-21).

Further, a BSR may be triggered for the UE to transmit a regular BSR, in which when random access is triggered for BSR transmission, the UE determines whether the base station configures whether a two-step random access procedure is available for BSR transmission. When it is configured that a two-step random access procedure is available for BSR transmission, the UE transmits the BSR using a two-step random access procedure; otherwise, the UE performs four-step random access (1g-15 and 1g-21).

Figure 1H:
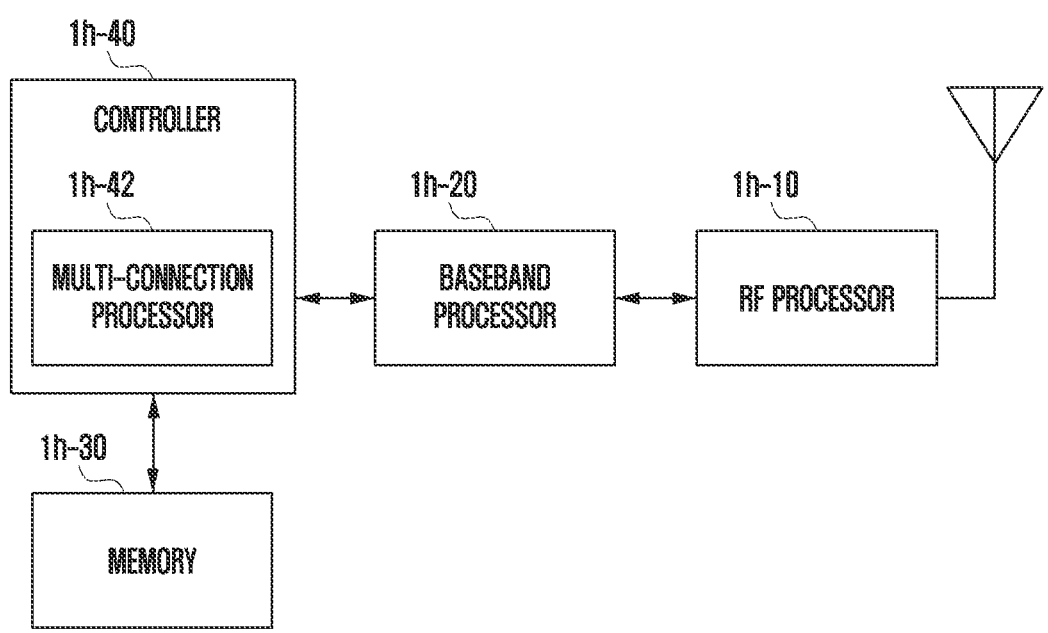
FIG. 1H is a block diagram illustrating the configuration of a UE in a wireless communication system according to an embodiment of the disclosure.

FIG. 1H is a block diagram illustrating the configuration of a UE in a wireless communication system according to an embodiment of the disclosure.

Referring to FIG. 1H, the UE includes a radio frequency (RF) processor 1h-10, a baseband processor 1h-20, a storage unit 1h-30, and a controller 1h-40.

The RF processor 1h-10 performs a function for transmitting or receiving a signal through a wireless channel, such as band conversion and amplification of a signal. That is, the RF processor 1h-10 upconverts a baseband signal, provided from the baseband processor 1h-20, into an RF band signal to transmit the RF band signal through an antenna and downconverts an RF band signal, received through the antenna, into a baseband signal. For example, the RF processor 1h-10 may include a transmission filter, a reception filter, an amplifier, a mixer, an oscillator, a digital-to-analog converter (DAC), and an analog-to-digital converter (ADC). Although FIG. 1H shows only one antenna, the UE may include a plurality of antennas. In addition, the RF processor 1h-10 may include a plurality of RF chains. Further, the RF processor 1h-10 may perform beamforming. For beamforming, the RF processor 1h-10 may adjust the phase and strength of each of signals transmitted and received through a plurality of antennas or antenna elements.

The baseband processor 1h-20 performs a function of converting a baseband signal and a bit stream according to the physical-layer specification of a system. For example, in data transmission, the baseband processor 1h-20 encodes and modulates a transmission bit stream, thereby generating complex symbols. In data reception, the baseband processor 1h-20 demodulates and decodes a baseband signal, provided from the RF processor 1h-10, thereby reconstructing a reception bit stream. For example, according to OFDM, in data transmission, the baseband processor 1h-20 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processor 1h-20 divides a baseband signal, provided from the RF processor 1h-10, into OFDM symbols, reconstructs signals mapped to subcarriers through a fast Fourier transform (FFT), and reconstructs a reception bit stream through demodulation and decoding.

As described above, the baseband processor 1h-20 and the RF processor 1h-10 transmit and receive signals. Accordingly, the baseband processor 1h-20 and the RF processor 1h-10 may be referred to as a transmitter, a receiver, a transceiver, or a communication unit. At least one of the baseband processor 1h-20 and the RF processor 1h-10 may include a plurality of communication modules to support a plurality of different radio access technologies. Further, at least one of the baseband processor 1h-20 and the RF processor 1h-10 may include different communication modules for processing signals in different frequency bands. For example, the different radio access technologies may include a wireless LAN (for example, IEEE 802.11), a cellular network (for example, an LTE network), and the like. In addition, the different frequency bands may include a super high frequency (SHF) band (for example, 2.5 GHz or 5 GHz) and a millimeter wave band (for example, 60 GHz).

The storage unit 1h-30 stores data, such as a default program, an application, and configuration information for operating the UE. In particular, the storage unit 1h-30 may store information about a wireless local-area network (WLAN) node performing wireless communication using a WLAN access technology. The storage unit 1h-30 provides stored data upon request from the controller 1h-40.

The controller 1h-40 controls overall operations of the UE. For example, the controller 1h-40 transmits and receives signals through the baseband processor 1h-20 and the RF processor 1h-10. Further, the controller 1h-40 records and reads data in the storage unit 1h-30. To this end, the controller 1h-40 may include at least one processor. For example, the controller 1h-40 may include a communication processor (CP) to perform control for communication and an application processor (AP) to control an upper layer, such as an application. According to the embodiment, the controller 1h-40 includes a multi-connection processor 1h-42 to perform processing for an operation in a multi-connection mode. For example, the controller 1h-40 may control the UE to perform the procedure of operations of the UE illustrated in FIG. 1E.

When random access is triggered according to configuration information indicated by a base station, the controller 1h-40 according to the embodiment may indicate the UE to perform two-step random access or four-step random access.

Figure 1I:
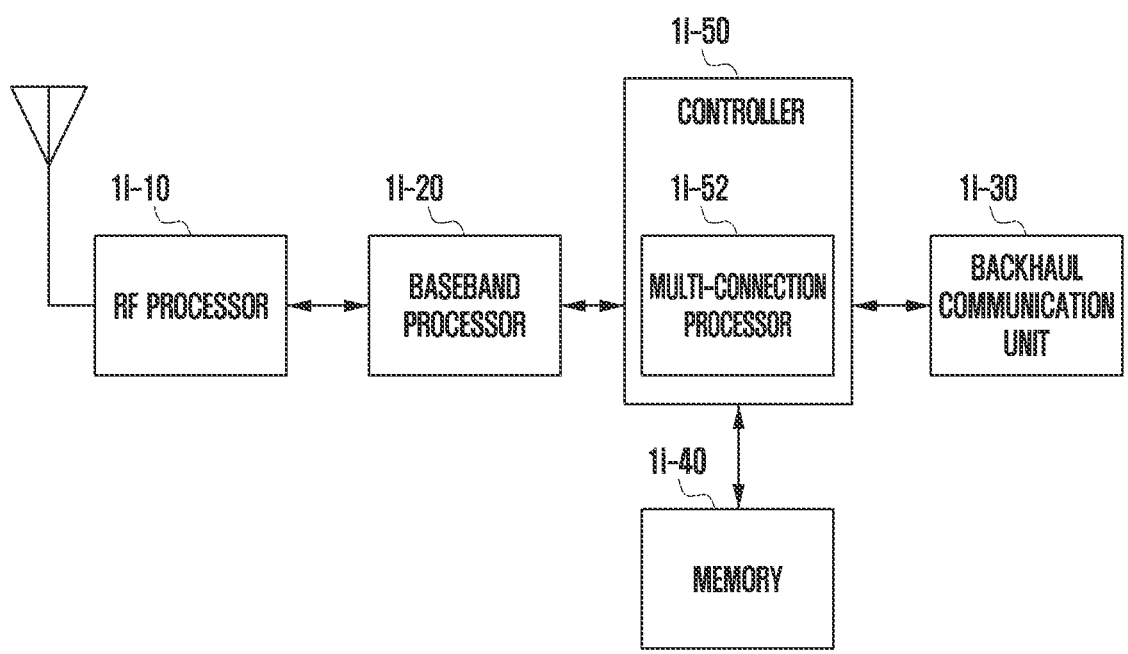
FIG. 1I is a block diagram illustrating the configuration of a base station in a wireless communication system according to an embodiment of the disclosure.

FIG. 1I is a block diagram illustrating the configuration of a base station in a wireless communication system according to an embodiment of the disclosure.

Referring to FIG. 1I, the base station includes an RF processor 1i-10, a baseband processor 1i-20, a backhaul communication unit 1i-30, a storage unit 1i-40, and a controller 1i-50.

The RF processor 1i-10 performs a function for transmitting or receiving a signal through a wireless channel, such as band conversion and amplification of a signal. That is, the RF processor 1i-10 upconverts a baseband signal, provided from the baseband processor 1i-20, into an RF band signal to transmit the RF band signal through an antenna and downconverts an RF band signal, received through the antenna, into a baseband signal. For example, the RF processor 1i-10 may include a transmission filter, a reception filter, an amplifier, a mixer, an oscillator, a DAC, and an ADC. Although FIG. 1I shows only one antenna, the base station may include a plurality of antennas. In addition, the RF processor 1i-10 may include a plurality of RF chains. Further, the RF processor 1i-10 may perform beamforming. For beamforming, the RF processor 1i-10 may adjust the phase and strength of each of signals transmitted and received through a plurality of antennas or antenna elements. The RF processor may transmit one or more layers, thereby performing downlink MIMO.

The baseband processor 1i-20 performs a function of converting a baseband signal and a bit stream according to the physical-layer specification of a first radio access technology. For example, in data transmission, the baseband processor 1i-20 encodes and modulates a transmission bit stream, thereby generating complex symbols. In data reception, the baseband processor 1i-20 demodulates and decodes a baseband signal, provided from the RF processor 1i-10, thereby reconstructing a reception bit stream. For example, according to OFDM, in data transmission, the baseband processor 1i-20 generates complex symbols by encoding and modulating a transmission bit stream, maps the complex symbols to subcarriers, and constructs OFDM symbols through an IFFT and CP insertion. In data reception, the baseband processor 1i-20 divides a baseband signal, provided from the RF processor 1i-10, into OFDM symbols, reconstructs signals mapped to subcarriers through an FFT, and reconstructs a reception bit stream through demodulation and decoding. As described above, the baseband processor 1i-20 and the RF processor 1i-10 transmit and receive signals. Accordingly, the baseband processor 1i-20 and the RF processor 1i-10 may be referred to as a transmitter, a receiver, a transceiver, a communication unit, or a wireless communication unit.

The backhaul communication unit 1i-30 provides an interface for performing communication with other nodes in a network. That is, the backhaul communication unit 1i-30 converts a bit stream, transmitted from the main base station to another node, for example, a secondary base station or a core network, into a physical signal and converts a physical signal, received from the other node, into a bit stream.

The storage unit 1i-40 stores data, such as a default program, an application, and configuration information for operating the main base station. In particular, the storage unit 1i-40 may store information on a bearer allocated to a connected UE, a measurement result reported from a connected UE, and the like. The storage unit 1i-40 provides stored data upon request from the controller 1i-50.

The controller 1i-50 controls overall operations of the main base station. For example, the controller 1i-50 transmits and receives signals through the baseband processor 1i-20 and the RF processor 1i-10 or through the backhaul communication unit 1i-30. Further, the controller 1i-50 records and reads data in the storage unit 1i-40. To this end, the controller 1i-50 may include at least one processor (e.g., multi-connection processor 1i-52).

Methods according to embodiments illustrated in the claims or specification may be implemented by hardware, software, or a combination of hardware and software.

When the methods are implemented by software, a computer-readable storage medium storing one or more programs (software modules) may be provided. One or more programs stored in the computer-readable storage medium are configured for execution by one or more processors in an electronic device. The one or more programs include instructions that enable the electronic device to execute the methods according to the embodiments illustrated in the claims or specification.

These programs (software modules or software) may be stored in a random-access memory, a nonvolatile memory including a flash memory, a read-only memory (ROM), an electrically erasable programmable ROM (EEPROM), a magnetic disc storage device, a compact disc ROM (CD-ROM), digital versatile discs (DVDs), an optical storage device in a different form, a magnetic cassette, or a memory configured in a combination of some or all thereof. In addition, each constituent memory may be included in plural.

Further, the programs may be stored in an attachable storage device which is accessible through a communication network, such as the Internet, an intranet, a local area network (LAN), a wide area network (WLAN), or a storage area network (SAN), or a communication network configured in a combination thereof. This storage device may be connected to a device for performing an embodiment through an external port. In addition, a separate storage device on a communication network may be connected to a device for performing an embodiment.

Figure 2A:
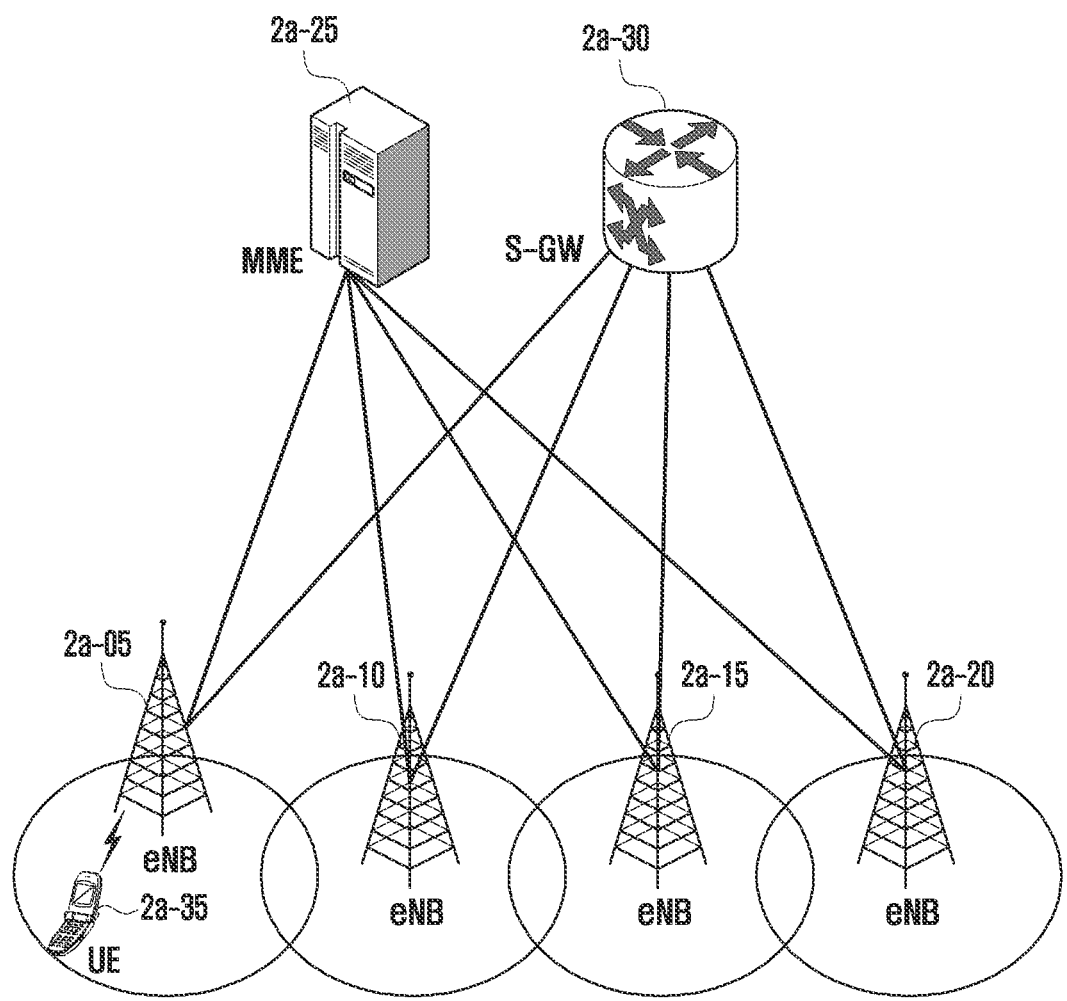
FIG. 2A illustrates the structure of an LTE system for reference to describe the disclosure according to an embodiment of the disclosure.

FIG. 2A illustrates the structure of an LTE system for reference to describe the disclosure according to the embodiment of the disclosure. An NR system also has substantially the same structure.

Referring to FIG. 2A, the wireless communication system includes a plurality of base stations 2a-05, 2a-10, 2a-15, and 2a-20, a mobility management entity (MME) 2a-25, and a serving-gateway (S-GW) 2a-30. A user equipment (hereinafter, "UE" or "terminal") 2a-35 is connected to an external network through the base stations 2a-05, 2a-10, 2a-15, and 2a-20 and the S-GW 2a-30.

The base stations 2a-05, 2a-10, 2a-15, and 2a-20 are access nodes of a cellular network and provide wireless connection for UEs connected to the network. That is, in order to serve traffic of users, the base stations 2a-05, 2a-10, 2a-15, and 2a-20 performs scheduling by collecting state information on UEs, such as a buffer state, an available transmission power state, and a channel state and supports connection between the UEs and a core network (CN). The MME 2a-25 is a device that performs not only a mobility management function for a UE but also various control functions and is connected to a plurality of base stations. The S-GW 2a-30 is a device that provides a data bearer. The MME 2a-25 and the S-GW 2a-30 may further perform authentication and bearer management for a UE connected to the network and processes a packet transmitted from the base stations 2a-05, 2a-10, 2a-15, and 2a-20 or a packet to be transmitted to the base stations 2a-05, 2a-10, 2a-15, and 2a-20.

Figure 2B:
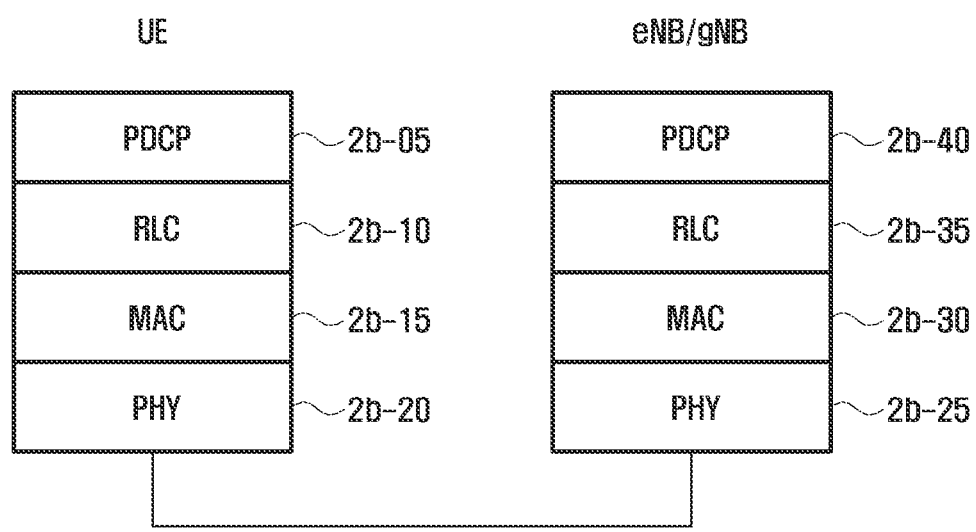
FIG. 2B illustrates the structure of wireless protocols for an LTE system and an NR system for reference to describe the disclosure according to an embodiment of the disclosure.

FIG. 2B illustrates the structure of wireless protocols for an LTE system and an NR system for reference to describe the disclosure according to an embodiment of the disclosure.

Referring to FIG. 2B, the wireless protocols for the LTE system include a packet data convergence protocol (PDCP) 2b-05 and 2b-40, a radio link control (RLC) 2b-10 and 2b-35, and a medium access control (MAC) 2b-15 and 2b-30 for each of a UE and an eNB. The packet data convergence protocol (PDCP) 2b-05 and 2b-40 is responsible for IP header compression/decompression operations, and the radio link control (hereinafter, "RLC") 2b-10 and 2b-35 reconfigures a PDCP packet data unit (PDU) into an appropriate size. The MAC 2b-15 and 2b-30 is connected to a plurality of RLC layer devices configured in one UE, multiplexes RLC PDUs to an MAC PDU, and demultiplexes RLC PDUs from an MAC PDU. A physical layer 2b-20 and 2b-25 performs channel coding and modulation of upper-layer data and makes the upper-layer data into an OFDM symbol to thereby transmit the OFDM symbol data via a radio channel or performs demodulation and channel decoding of an OFDM symbol received through a radio channel to thereby transmit the OFDM symbol to an upper layer. The physical layer also uses hybrid ARQ (HARQ) for additional error correction, in which a reception terminal transmits one bit to indicate whether a packet transmitted from a transmission terminal is received. This is referred to as HARQ ACK/NACK information. In LTE, downlink HARQ ACK/NACK information in response to uplink transmission may be transmitted through a physical channel, such as a physical hybrid-ARQ indicator channel (PHICH). In NR, it may be determined through scheduling information about the UE in a physical dedicated control channel (PDCCH), which is a channel for transmitting downlink/uplink resource allocation, whether downlink HARQ ACK/NACK information in response to uplink transmission needs retransmitting or is newly transmitted, because asynchronous HARQ is applied in NR. Uplink HARQ ACK/NACK information in response to downlink transmission may be transmitted through a physical channel, such as a physical uplink control channel (PUCCH) or physical uplink shared channel (PUSCH). The PUCCH is generally transmitted in an uplink of a PCell to be described. However, when a UE is supportive, a base station may additionally transmit the PUCCH to the UE in a SCell to be described, which is referred to as a PUCCH SCell.

Although not shown in the drawing, a radio resource control (RRC) layer exists above the PDCP layer of each of the UE and the base station. The RRC layer may exchange connection and measurement-related setup control messages for radio resource control.

The physical layer may include one frequency/carrier or a plurality of frequencies/carriers, and a technology of simultaneously configuring and using a plurality of frequencies is referred to as carrier aggregation (hereinafter, "CA"). In CA, instead of using one carrier, a main carrier and one additional subcarrier or a plurality of additional subcarriers are used for communication between a terminal (or UE) and a base station E-UTRAN NodeB (eNB), thereby dramatically increasing the transmission amount as much as the number of subcarriers. In LTE, a cell of a base station using a main carrier is referred to as a primary cell (PCell), and a cell using a subcarrier is referred to as a secondary cell (SCell).

Figure 2C:
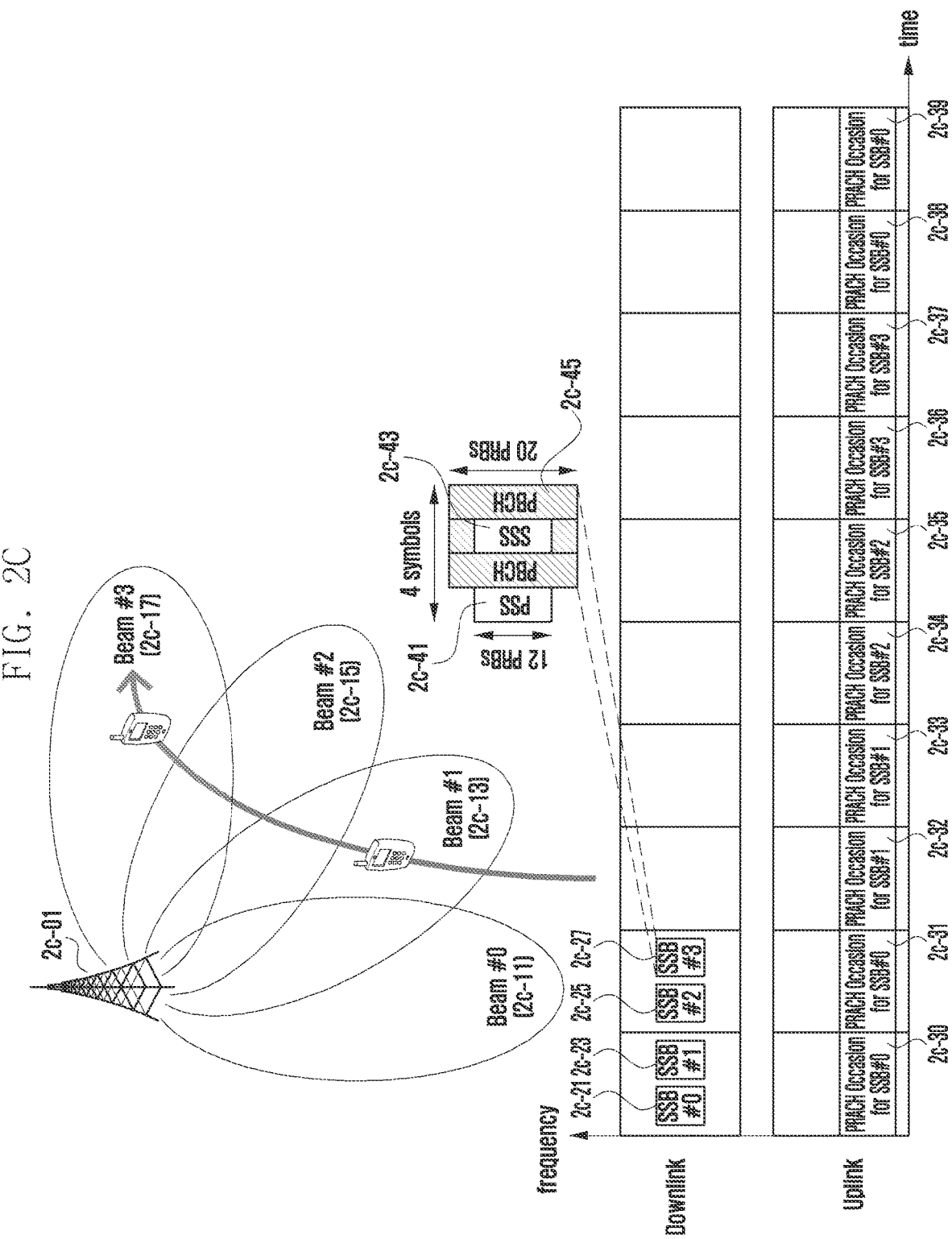
FIG. 2C illustrates the structure of downlink and uplink channel frames for beam-based communication in an NR system according to an embodiment of the disclosure.

FIG. 2C illustrates the structure of downlink and uplink channel frames for beam-based communication in an NR system according to an embodiment of the disclosure.

Referring to FIG. 2C, a base station 2c-01 transmits a signal in the form of a beam to increase coverage or to transmit a stronger signal (2c-11, 2c-13, 2c-15, and 2c-17). Accordingly, a UE 2c-03 in a cell needs to transmit and receive data using a particular beam (beam #1 2c-13 in this example) transmitted by the base station 2c-01.

The state of the UE 2c-03 is divided into an RRC_IDLE state and an RRC_CONNECTED state depending on whether the UE 2c-03 is connected to the base station 2c-01. Thus, the base station 2c-01 does not know the position of the UE 2c-03 in the RRC_IDLE state.

When the UE 2c-03 in the RRC_IDLE state wishes to transition to the RRC_CONNECTED state, the UE 2c-03 receives synchronization signal blocks (SSBs) 2c-21, 2c-23, 2c-25, and 2c-27 transmitted by the base station 2c-01. The SSBs are SSB signals periodically transmitted according to a period set by the base station 2c-01, and each SSB is divided into a primary synchronization signal (PSS) 2c-41, a secondary synchronization signal (SSS) 2c-43, and a physical broadcast channel (PBCH) 2c-45.

In this illustrated drawing, it is assumed that an SSB is transmitted per beam. For example, it is assumed that SSB #0 2c-21 is transmitted using beam #0 2c-11, SSB #1 2c-23 is transmitted using beam #1 2c-13, SSB #2 2c-25 is transmitted using beam #2 2c-15, and SSB #3 2c-27 is transmitted using beam #3 2c-17. In this illustrated drawing, it is assumed that the UE 2c-03 in the RRC_IDLE state is positioned on beam #1 2c-13. However, even when the UE 2c-03 in the RRC_CONNECTED state performs random access, the UE 2c-03 selects an SSB received at the time of performing the random access.

Accordingly, in this drawing, the UE 2c-03 receive SSB #1 2c-23 transmitted via beam #1 2c-13. Upon receiving SSB #1 2c-23, the UE 2c-03 may obtain a physical cell identifier (PCI) of the base station 2c-01 through a PSS and an SSS and may identify the identifier (that is, #1) of the currently received SSB, a position where the current SSB is received in a 10-ms frame, and a system frame number (SFN) corresponding to the received SSB among SFNs a period of 10.24 seconds through a PBCH. Further, the PBCH includes a master information block (MIB), and the MIB indicates a position for receiving system information block type 1 (SIB1) broadcasting detailed configuration information about the cell. Upon receiving SIB1, the UE 2c-03 may know the total number of SSBs transmitted by the base station 2c-01 and may identify the position (2c-30 to 2c-39 assuming that allocation is performed every 1 ms in this illustrated drawing) of a physical random access channel (PRACH) occasion for performing random access to transition to the RRC_CONNECTED state (specifically for transmitting a preamble as a physical signal specially designed for uplink synchronization). In addition, the UE 2c-03 may identify which PRACH occasions among the PRACH occasions is mapped to which SSB index based on this information. For example, in this illustrated drawing, it is assumed that allocation is performed every 1 ms and that a ½ SSB per PRACH occasion (that is, two PRACH occasions per SSB) is allocated. Accordingly, two PRACH occasions are allocated for each SSB from the start of a PRACH occasion starting according to the SFN. That is, 2c-30 and 2c-31 are allocated for SSB #0 2c-21, 2c-32 and 2c-33 are allocated for SSB #1 2c-23, and the like. After configuring PRACH occasions for all the SSBs, PRACH occasions are allocated again for the first SSB (2c-38 and 2c-39).

Accordingly, the UE 2c-03 recognizes the positions of the PRACH occasions 2c-32 and 2c-33 for SSB #1 2c-23 and transmits a random access preamble via the earliest PRACH occasion (for example, 2c-32) of the PRACH occasions 2c-32 and 2c-33 corresponding to SSB #1 2c-23. Since receiving the preamble in the PRACH occasion 2c-32, the base station 2c-01 can recognize that the UE 2c-03 has selected SSB #1 2c-23 to transmit the preamble and accordingly transmits and receives data through the corresponding beam in subsequent random access.

When the UE 2c-03 in the RRC_CONNECTED state moves from a current (source) base station to a destination (target) base station due to a handover or the like, the UE 2c-03 performs random access in the target base station and performs an operation of selecting an SSB and transmitting a random access preamble. In a handover, a handover command is transmitted to the UE 2c-03 to move from the source base station to the target base station. In this message, a random access preamble index dedicated to the UE may be allocated per SSB of the target base station so as to be used when performing random access in the target base station. In this case, the base station may not allocate a dedicated random access preamble index for all beams (depending on the current position of the UE or the like), and thus some SSBs may not be allocated a dedicated random access preamble (for example, a dedicated random access preamble is allocated only to beam #2 and beam #3). When an SSB selected by the UE 2c-03 for preamble transmission is not allocated a dedicated random access preamble, the UE randomly selects a contention-based random access preamble to perform random access. For example, referring to this drawing, after initially performing random access at beam #1 2c-13 but failing, the UE 2c-03 may transmit a dedicated preamble at beam #3 2c-17 when transmitting a random access preamble again. That is, even in one random access procedure, when preamble retransmission is performed, a contention-based random access procedure and a contention-free random access procedure may be mixed according to whether a dedicated random access preamble is allocated in a selected SSB for each preamble transmission.

Figure 2D:
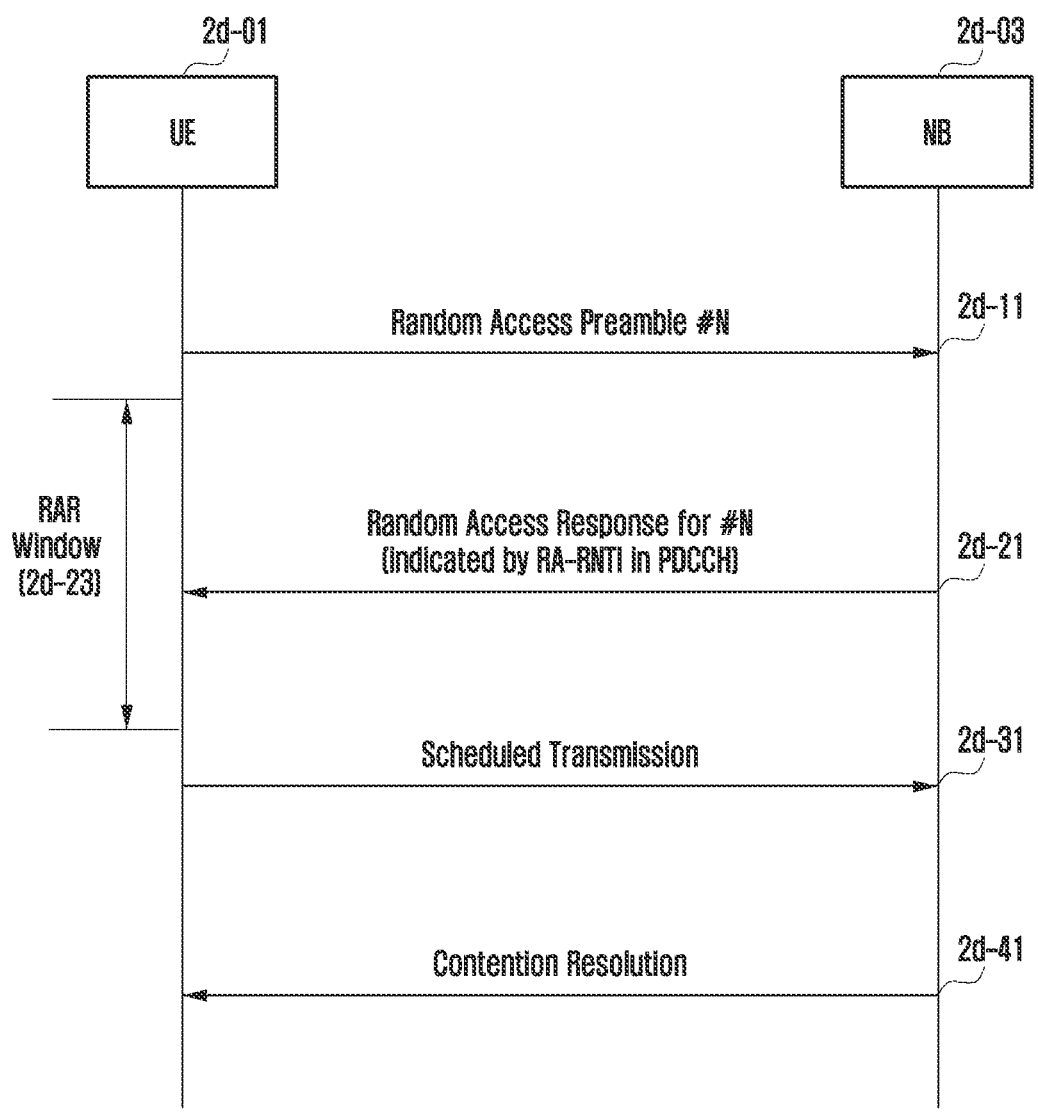
FIG. 2D illustrates a procedure in which a UE performs contention-based four-step random access to a base station according to an embodiment of the disclosure.

FIG. 2D illustrates a contention-based four-step random access procedure performed by a UE in initial connection to a base station, reconnection to a base station, a handover to a base station, or other cases where random access is required according to an embodiment of the disclosure.

For connection to a base station 2d-03, a UE 2d-01 selects a PRACH according to FIG. 2C and transmits a random access preamble via the PRACH (2d-11). One or more UEs may simultaneously transmit a random access preamble through the PRACH resource. The PRACH resource may span one subframe or may occupy only some symbols in one subframe. Information about the PRACH resource is included in system information broadcasted by the base station 2d-03 and indicates a time-frequency resource to be used to transmit a preamble. The random access preamble is a specific sequence specially designed to be received even though transmitted before synchronization with the base station 2d-03 is completely achieved, and may have a plurality of preamble indexes according to a standard. When there is a plurality of preamble indexes, the preamble transmitted by the UE 2d-01 may be a preamble randomly selected by the UE 2d-01 or may be a specific preamble designated by the base station 2d-03.

Upon receiving the preamble, the base station 2d-03 transmits a random access response (hereinafter, "RAR") message to the UE 2d-01 in response (2d-21). The RAR message includes identifier information about the preamble used in operation 2d-11, uplink transmission timing correction information, allocation information about an uplink resource to be used in a subsequent operation (that is, operation 2d-31), and temporary UE identifier information. The identifier information about the preamble is transmitted to indicate to which preamble the RAR message is a response message, for example, when a plurality of UEs attempts random access by transmitting different preambles in operation 2d-11. The allocation information about the uplink resource is specific information about the resource to be used by the UE 2d-01 in operation 2d-31 and includes physical position and size of the resource, a modulation and coding scheme (MCS) used for transmission, power adjustment information for transmission, or the like. The temporary UE identifier information is a value transmitted for the case where the UE does not have an identifier allocated by the base station for communication with the base station when the UE transmits the preamble for initial connection.

The RAR message needs to be transmitted within a predetermined period starting after a predetermined time from the time the preamble is transmitted, and this period is referred to as an RAR window 2d-23. The RAR window starts after the predetermined time from the time the first preamble is transmitted. The predetermined time may have a subframe unit (2 ms) or shorter. The length of the RAR window may be a predetermined value set by the base station 2d-03 for each PRACH resource or for one or more PRACH resource sets in a system information message broadcast by the base station 2d-03.

When transmitting the RAR message, the base station 2d-03 schedules the RAR message through a PDCCH, and scheduling information is scrambled using a random access-radio network temporary identifier (RA-RNTI). The RA-RNTI is mapped to the PRACH resource used to transmit the message 2d-11, and the UE 2d-01 having transmitted the preamble via the specific PRACH resource attempts to receive a PDCCH based on the RA-RNTI and determines whether there is a corresponding RAR message. That is, when the RAR message is a response to the preamble transmitted by the UE 2d-01 in operation 2d-11 as in the illustrated drawing, the RA-RNTI used for the scheduling information about the RAR message includes information about the transmission in operation 2d-11. The RA-RNTI may be calculated by the following equation:

$$\text{RA-RNTI} = 1 + s\_id + 14 \times t\_id + 14 \times 80 \times f\_id + 14 \times 80 \times 8 \times ul\_carrier\_id$$

where s_id is an index corresponding to the first OFDM symbol in which transmission of the preamble transmitted in operation 2d-11 starts and has a value satisfying $0 \leq s\_id < 14$ (that is, the maximum number of OFDM symbols in one slot); t_id is an index corresponding to the first slot in which transmission of the preamble transmitted in operation 2d-11 starts and has a value satisfying $0 \leq t\_id < 80$ (that is, the maximum number of slots in one system frame (20 ms)); the f_id indicates a PRACH resource used to transmit the preamble transmitted in operation 2d-11 on the frequency and has a value satisfying $0 \leq f\_id < 8$ (that is, the maximum number of PRACHs on the frequency within the same time); and ul_carrier_id is a factor for distinguishing whether the preamble is transmitted in a normal uplink (NUL) (0 in this case) or in a supplementary uplink (SUL) (1 in this case) when two carriers are used in an uplink for one cell.

Upon receiving the RAR message, the UE 2d-01 transmits different messages via a resource allocated through the RAR message depending on the foregoing various purposes (2d-31). In this embodiment, the third transmitted message is also referred to as Msg3 (that is, the preamble in operation 2d-11 or 2d-13 is also referred to as Msg1, and the RAR in operation 2d-21 is also referred to as Msg2). As an example of Msg3 transmitted by the UE 2d-01, an RRCConnection-Request message, which is a message of an RRC layer, is transmitted for initial connection, an RRCConnectionReestablishmentRequest message is transmitted for reconnection, and an RRCConnectionReconfigurationComplete message is transmitted for a handover. Further, a buffer status report (BSR) message for a resource request may be transmitted.

Subsequently, in initial transmission (that is, Msg3 does not include base station identifier information previously allocated to the UE 2d-01), the UE 2d-01 receives a contention resolution message from the base station 2d-03 (2d-41), and the contention resolution message includes the same information as transmitted by the UE 2d-01 via Msg3, thus indicating to which UE the response corresponds when there is a plurality of UEs selecting the same preamble in operation 2d-11 or 2d-13.

Figure 2E:
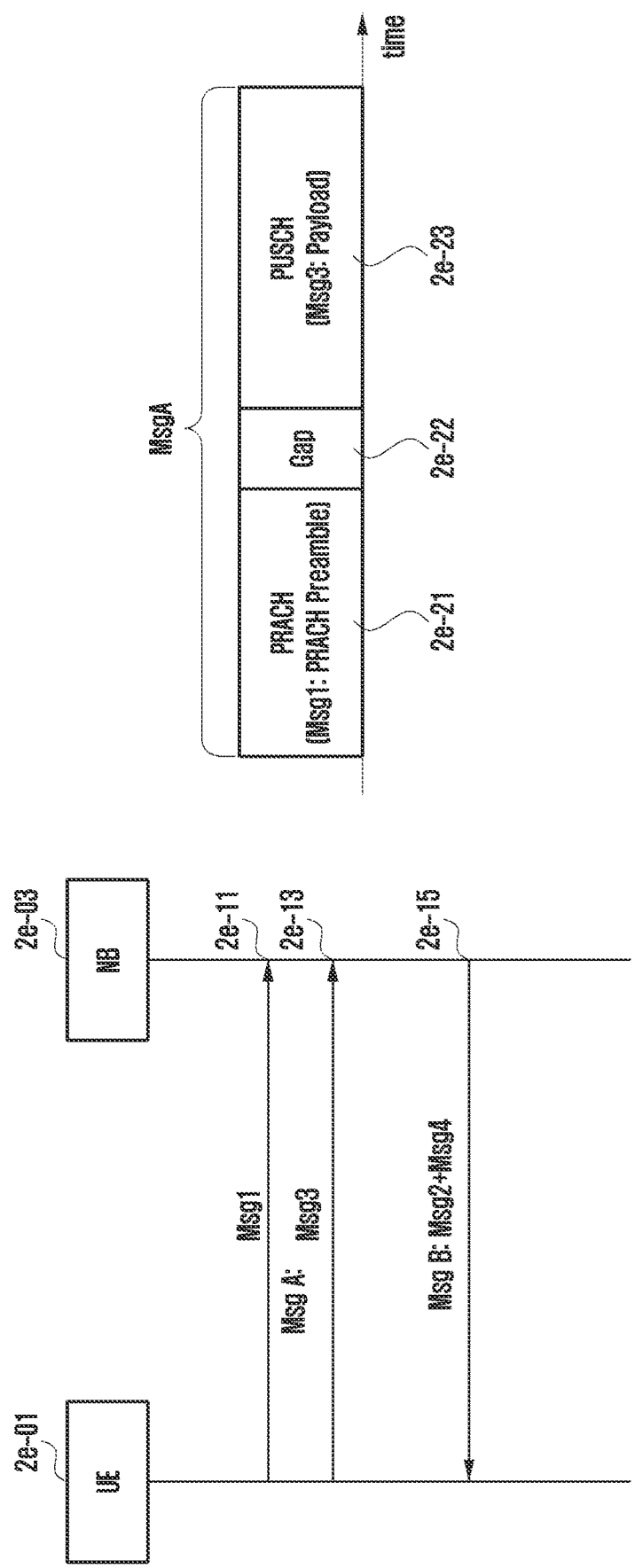
FIG. 2E illustrates a procedure in which a UE performs two-step random access to a base station according to an embodiment of the disclosure.

FIG. 2E illustrates a procedure in which a UE performs two-step random access to a base station according to an embodiment of the disclosure.

Referring to FIG. 2D, general contention-based random access involves at least four operations. If an error occurs in one operation, the procedure may be further delayed. Accordingly, it may be considered to reduce the random access procedure to a two-step procedure.

To this end, a UE 2e-01 may transmit MsgA of consecutively transmitting preambles Msg1 (2e-11 corresponding to 2d-11) and Msg3 (2e-13 corresponding to 2d-31) of a four-step random access procedure to a base station 2e-03 (2e-15), and the base station 2e-03 receiving MsgA may transmit MsgB 2e-19 including information of Msg2 (RAR corresponding to 2d-21) and Msg4 (corresponding to 2d-41) of the four-step random access procedure to the UE 2e-01, thereby reducing a random access procedure.

In this case, when shown in time, MsgA may include a PRACH resource 2e-21 for transmitting Msg1, a PUSCH resource 2e-23 for transmitting Msg3, and a gap resource 2e-22 for resolving interference that may occur in transmission via the PUSCH resource.

As described above in FIG. 2D, the UE 2e-01 performs random access for various purposes. For example, the UE 2e-01 may perform random access in order to transmit a message for connection when not yet connected to the base station 2e-03 or in order to transmit a message for recovering connection when disconnected from the base station 2e-03 due to an error, and these messages belong to a common control channel (CCCH). Control messages belonging to the CCCH include RRCSetupRequest (for transition from RRC_IDLE to RRC_CONNECTED), RRCResumeRequest (for transition from RRC_INACTIVE to RRC_CONNECTED), RRCReestablishmentRequest (for reestablishing connection), and RRCSystemInfoRequest (upon request for system information broadcast by the base station). When the UE 2e-01 performs the foregoing two-step random access in every CCCH transmission, a collision between messages may incur a serious delay in the random access procedure. Thus, random access may be performed only for a predetermined message among the messages belonging to the CCCH. For example, since RRCReestablishmentRequest transmitted for connection recovery or RRCResumeRequest used in transition from RRC_INACTIVE to RRC_CONNECTED is a high-priority message, two-step random access may be performed for these messages when random access is required. However, it may not matter if a delay occurs in RRCSystemInfoRequest, four-step random access described above may be performed to transmit this message instead of two-step random access. Alternatively, CCCH messages may be determined to have a higher priority than that of messages of other dedicated control channels and dedicated traffic channels, which will be described later, and may be transmitted using two-step random access.

When the UE 2e-01 is normally connected to the base station 2e-03, the UE 2e-01 may transmit and receive a message belonging to a dedicated control channel (DCCH) and a dedicated traffic channel (DTCH) in RRC_CONNECTED. For the message transmitted by the UE 2e-01, the UE 2e-01 needs to transmit a buffer status report (BSR) message indicating that the UE 2e-01 has data to transmit via an uplink to the base station 2e-03, thereby requesting uplink resource allocation. To this end, the base station 2e-03 may allocate a dedicated PUCCH resource for transmitting a scheduling request (SR) for a specific logical channel to the UE 2e-01. Accordingly, when receiving an SR from the UE 2e-01 via a PUCCH, the base station 2e-03 allocates an uplink resource for transmitting a BSR. When the UE 2e-01 transmits a BSR via the uplink resource, the base station 2e-03 may identify the buffer state of the UE 2e-01 and may allocate an uplink resource for data.

When the base station 2e-03 does not allocate the SR in the specific logical channel (a logical concept divided according to the type of control and normal data) or when the SR is allocated but an uplink resource is not allocated despite transmitting the SR as many times as the maximum number of SR transmissions, thus not transmitting a BSR, the UE 2e-01 may perform random access to transmit a BSR to the base station 2e-03 via Msg3.

Accordingly, when the UE 2e-01 is connected to the base station 2e-03 and then configures a logical channel for transmitting data belonging to each of a dedicated control channel (DCCH) and a dedicated traffic channel (DTCH), the UE 2e-01 may set whether two-step random access can be performed when performing random access for transmitting the logical channel. For example, the base station 2e-03 may configure two-step random access to be enabled for a logical channel for a DCCH (for example, control radio bearer 1, control radio bearer 2, and control radio bearer 3) and a logical channel for traffic having a high priority.

Accordingly, when the UE 2e-01 in the RRC_CONNECTED state performs random access, two-step random access may be performed or four-step random access may be performed depending on whether two-step random access is allowed for a logical channel triggering the random access.

Figure 2F:
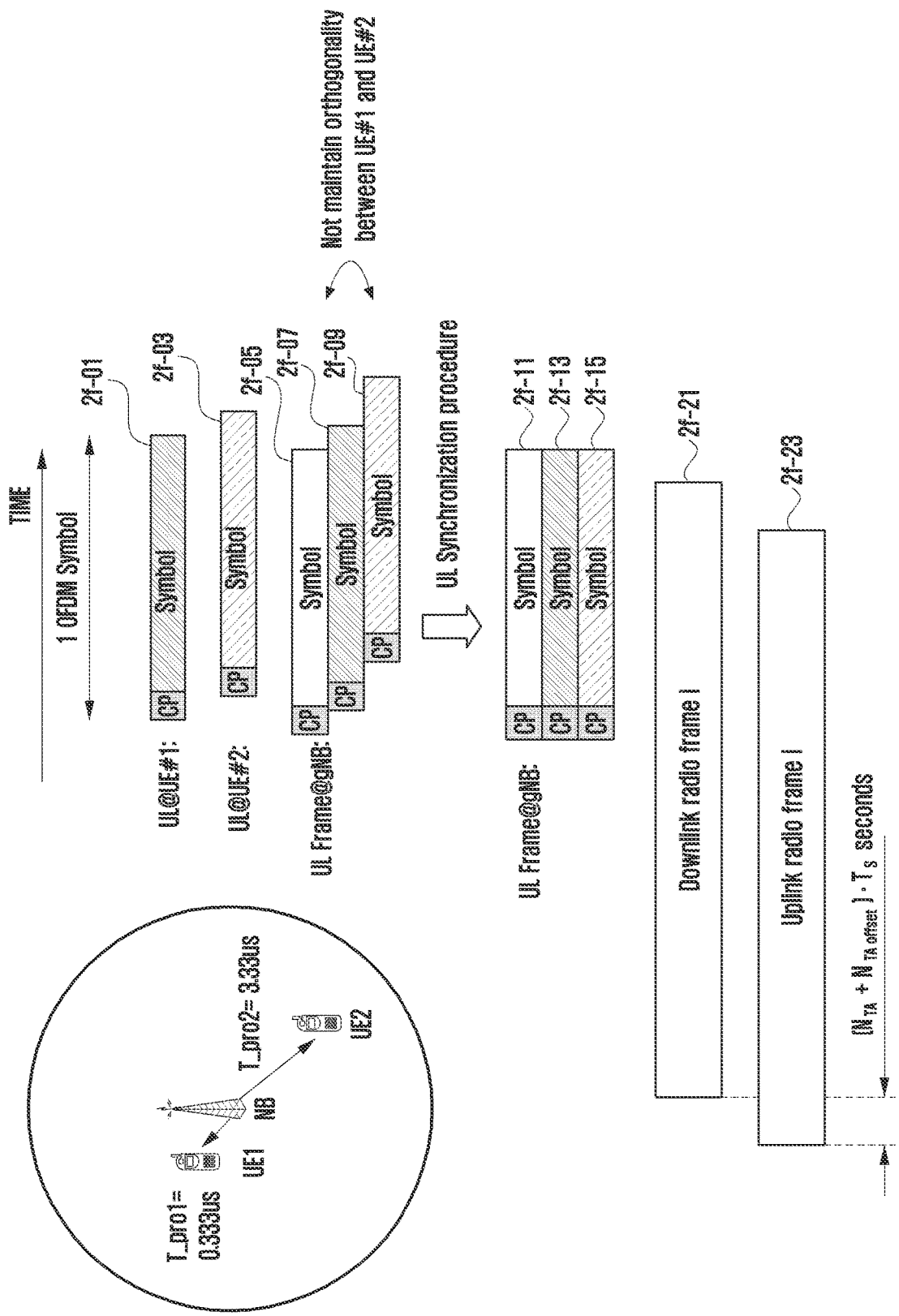
FIG. 2F illustrates the necessity and the role of an uplink timing synchronization procedure in a system employing orthogonal frequency-division multiplexing (OFDM) according to an embodiment of the disclosure.

FIG. 2F illustrates the necessity and the role of an uplink timing synchronization procedure in a system employing OFDM according to an embodiment of the disclosure.

UE1 (hereinafter, "terminal 1") refers to a terminal positioned close to a gNB (base station), and UE2 (hereinafter, "terminal 2") refers to a terminal far from the gNB. A first propagation delay time (hereinafter, "T_pro1") refers to a propagation delay time in radio transmission to terminal 1, and a second propagation delay time (hereinafter, "T_pro2") refers to a propagation delay time in radio transmission to terminal 2.

Referring to FIG. 2F, terminal 1 is positioned closer to the gNB than terminal 2 and thus has a relatively short propagation delay time (in FIG. 2F, T_pro1 is 0.333 us, and T_pro2 is 3.33 us).

When terminal 1 and terminal 2 are powered on in one cell of the gNB of FIG. 2F or when terminal 1 and terminal 2 are in the idle mode, the uplink timing of terminal 1, the uplink timing of terminal 2, and the uplink timings of terminals in the cell detected by the gNB are not synchronized.

2f-01 indicates the timing synchronization of terminal 1 for uplink transmission of an OFDM symbol, and 2f-03 indicates the timing synchronization of terminal 2 for uplink transmission of an OFDM symbol. Considering the propagation delay times of terminal 1 and terminal 2 in uplink transmission, the gNB receives the uplink OFDM symbols at timings 2f-05, 2f-07, and 2f-09. That is, the uplink symbol of terminal 1 of 2f-01 is received at the gNB at the timing 2f-07 with a propagation delay time, and the uplink symbol of terminal 2 of 2f-03 is received at the gNB at the timing 2f-09 with a propagation delay time. As illustrated in FIG. 2F, since 2f-07 and 2f-09 are timings before uplink timings for terminal 1 and terminal 2 are not yet synchronized, the start timing 2f-05 at which the gNB receives and decodes an uplink OFDM symbol, the timing 2f-07 for receiving the OFDM symbol from terminal 1, and the timing 2f-09 for receiving the OFDM symbol from terminal 2 are different.

Accordingly, the uplink symbols transmitted from terminal 1 and terminal 2 do not have orthogonality and thus act as interference with each other, and the gNB cannot successfully decode the uplink symbols transmitted from terminal 1 of 2f-01 and terminal 2 of 2f-03 due to the interference and the timings 2f-07 and 2f-09 for receiving the uplink symbols not synchronized with 2f-05.

An uplink timing synchronization procedure is a process for synchronizing the uplink symbol reception timings of terminal 1, terminal 2, and the gNB. When the uplink timing synchronization procedure is completed, the start timing at which the gNB receives and decodes an uplink OFDM symbol, the timing for receiving an uplink OFDM symbol from terminal 1, and the timing for receiving an uplink OFDM symbol from terminal 2 are synchronized as indicated by 2f-11, 2f-13, and 2f-15. Specifically, the uplink symbol reception timings are aligned with an error within the length of a cyclic prefix (CP) to be synchronized, thus enabling the base station to perform decoding.

In the uplink timing synchronization procedure, the base station transmits timing advance (TA) information to the terminals to provide information about how much the timings are adjusted. Specifically, based on a predetermined downlink 2f-21, the base station provides information about how early transmission needs to be performed compared to the downlink.

The base station may transmit the TA information through a timing advance command MAC control element (TAC MAC CE) or also through a random access response (RAR) to a random access preamble transmitted by a terminal when performing random access to be described below, which applies to both LTE and NR.

For example, in LTE, in the RAR, the TA information is 12 bits, and thus $N_{TA}=TA*16$. In a TAC MAC CE, a TA value is six bits, and a relative value changing according to an existing $N_{TA}$ value ($N_{TA,old}$) is calculated, that is, follows the following equation: $N_{TA,new}=N_{TA,old}+(TA-31)*16$. Accordingly, an uplink transmission time is $(N_{TA}*NTA\_offset)*T_s$ earlier than the downlink (2f-23), where $N_{TA-offset}$ is 0 in an FDD system and is 624 in a TDD system, and $T_s$ is 1/(3048*subcarrier spacing). Accordingly, the terminal may adjust an uplink transmission time using the TA information.

The terminal receiving the TA information starts a time alignment timer (TAT). The TAT is a timer indicating whether a TA is valid. That is, the TA is determined to be valid in an interval in which the TAT operates, but the TA cannot be guaranteed to be valid after the operation of the TAT expires.

The terminal restarts the TAT when subsequently receiving additional TA information. When the TAT expires after a certain time, the terminal determines that the TA information received from the base station is no longer valid and stops uplink communication with the gNB.

When the timings are adjusted in this manner, the uplink symbols transmitted from terminal 1 and terminal 2 can maintain orthogonality, and the gNB can successfully decode uplink symbols transmitted from terminal 1 of 2f-Oland terminal 2 of 2f-03.

In the above-described random access procedure, it is not necessary to apply the TA value when transmitting a preamble, because the preamble signal is a signal designed to be decoded even when deviating from an arrival time as described above. However, when performing two-step random access, not only a preamble but also data (PUSCH) is transmitted. In this case, a UE needs to define $N_{TA}$ to be applied to transmit the PUSCH.

Figure 2G:
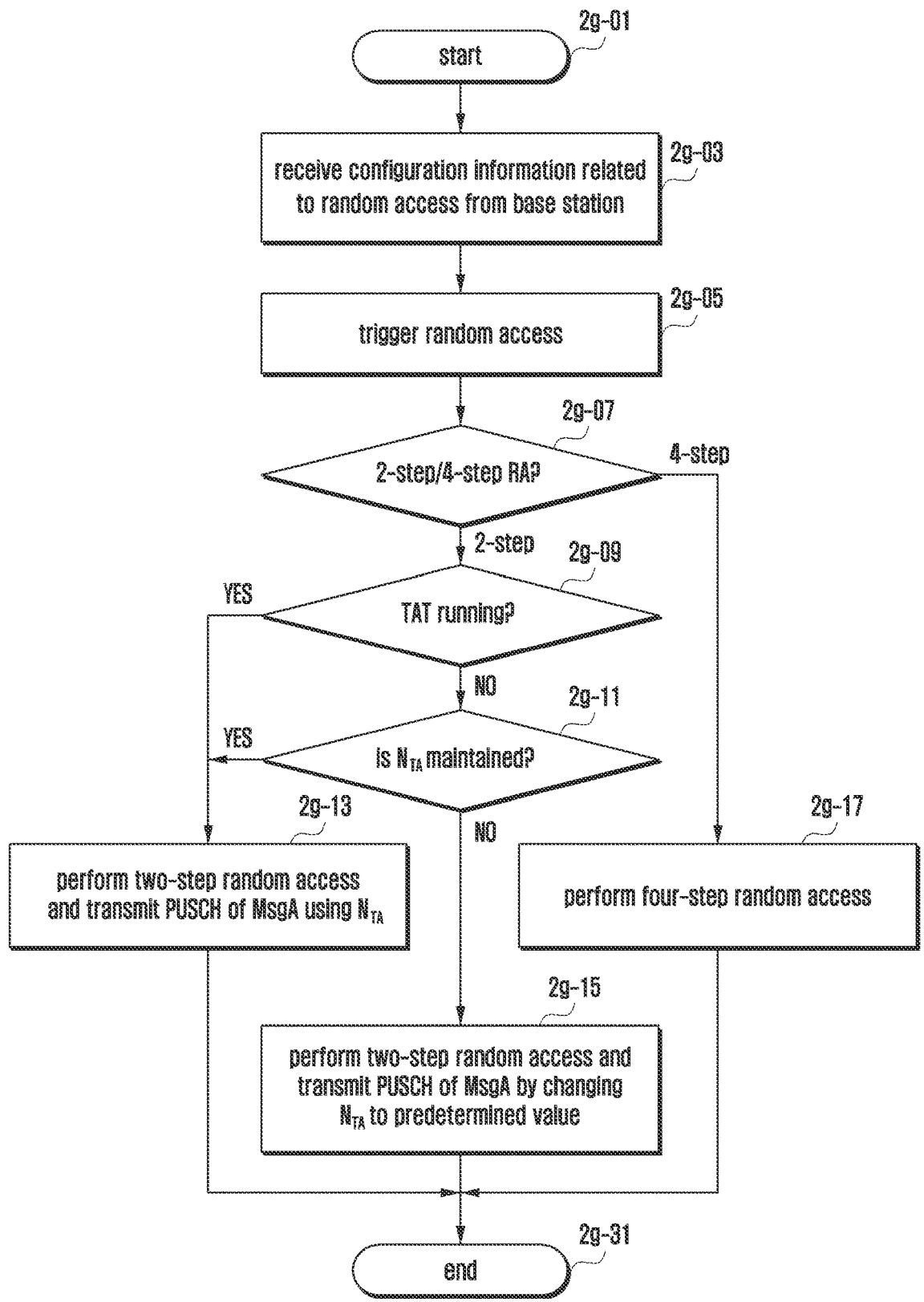
FIG. 2G illustrates an operation sequence in which a UE determines uplink transmission timing when performing two-step random access according to an embodiment of the disclosure.

FIG. 2G illustrates an operation sequence in which a UE determines uplink transmission timing when performing two-step random access according to an embodiment.

The UE receives configuration information related to random access from a base station (2g-03). The configuration information may be received via an SIB message broadcast by the base station or may be received by the UE via a dedicated RRC message. For example, CCCH transmission-related information may be included in a SIB message. When random access is configured for each UE as in a handover, the configuration information may be received by the UE via a dedicated RRC message transmitted only to the UE. The configuration information may include not only a random access-related configuration for four-step random access but also configuration information for two-step random access and may further include information indicating in which case two-step random access can be used.

Subsequently, the UE triggers a random access procedure (2g-05). The random access procedure may be triggered to transmit a CCCH for a transition from the RRC_IDLE state to the RRC_CONNECTED state, may be triggered for beam failure recovery, or may be triggered in handover/SCG addition scenarios.

When the random access is triggered, the UE determines whether to perform two-step random access or four-step random access according to the configuration information from the base station (2g-07). When the UE determines to perform four-step random access, the UE transmits a preamble via a corresponding PRACH resource to perform a four-step random access procedure (2g-17).

When the UE determines to perform two-step random access, the UE determines whether the TATs of cells timing advance group (TAG) using the same TA as a cell performing the random access are running (2g-09). For example, in a transition from the RRC_IDLE state to the RRC_CONNECTED state, the TAG of a connected PCell (PTAG) is not running. In addition, for example, when the UE has already transitioned to the RRC_CONNECTED state once, the UE receives TA information through an RAR and runs a TAT while performing the random access to transition to the RRC_CONNECTED state, and thus the TAT is running before expiring. When the TAT expires, the TAT is no longer running.

Accordingly, when the TAT is running, the UE determines that $N_{TA}$ calculated using a TA value previously received through an RAR or a TAC MAC CE is valid and performs the random access procedure by transmitting a PUSCH of MsgA using $N_{TA}$ in the two-step random access (2g-13).

However, when the TAT is not running, there are two methods for determining $N_{TA}$ to be applied when transmitting a PUSCH of MsgA in the two-step random access (2g-11).

A first method is setting $N_{TA}$ always to a predetermined value (e.g., 0). This method is simple but requires the gap 2e-22 illustrated in FIG. 2E to have a sufficiently large size in order to solve the problem described in FIG. 2F. That is, the gap is not a resource used to actually transmit and receive data, and when MsgA resources are allocated according to beams, waste of resources for the gap is also increased according to the number of supported beams.

A second method is determining whether a UE has existing $N_{TA}$ received from a cell to which the UE currently performs random access. That is, the UE may be connected to the cell by accessing the cell, may thus has a previously used $N_{TA}$ value, and may maintain the existing $N_{TA}$ value even though a TAT expires. Accordingly, when the TAT is not running but the existing $N_{TA}$ value is maintained, the UE performs the random access procedure by transmitting a PUSCH of MsgA using the $N_{TA}$ value in the two-step random access (2g-13). However, when the UE does not maintain $N_{TA}$ (e.g., when performing random access to transition from the RRC_IDLE state to the RRC_CONNECTED state), the UE performs the random access procedure by transmitting a PUSCH of MsgA using a predetermined $N_{TA}$ value in the two-step random access (2g-15).

Figure 2H:
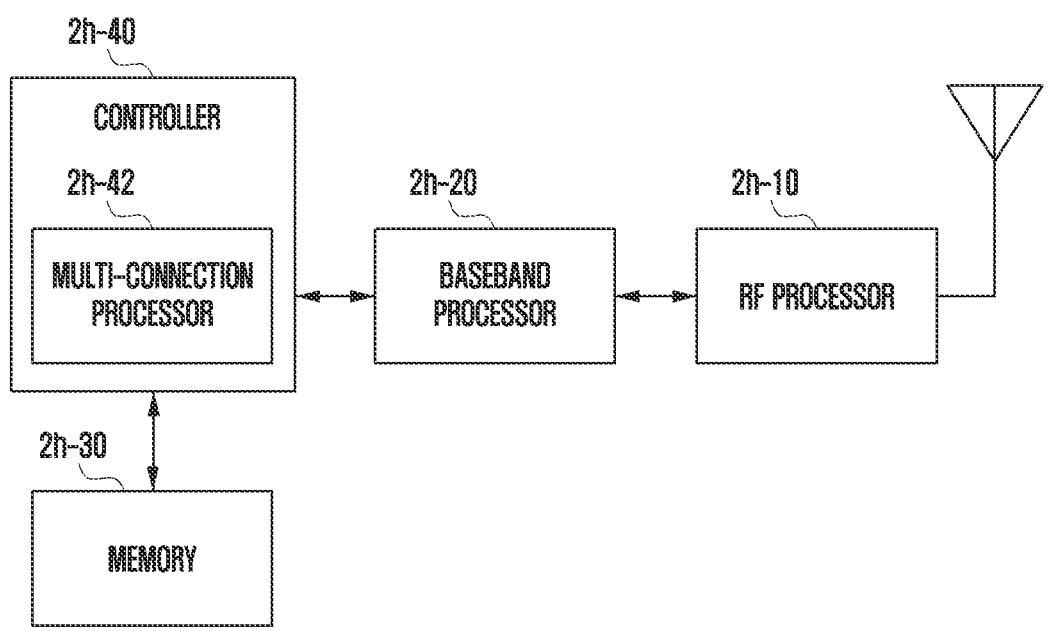
FIG. 2H is a block diagram illustrating the configuration of a UE in a wireless communication system according to an embodiment of the disclosure.

FIG. 2H is a block diagram illustrating the configuration of a UE in a wireless communication system according to an embodiment of the disclosure.

Referring to FIG. 2H, the UE includes a radio frequency (RF) processor 2h-10, a baseband processor 2h-20, a storage unit 2h-30, and a controller 2h-40.

The RF processor 2h-10 performs a function for transmitting or receiving a signal through a wireless channel, such as band conversion and amplification of a signal. That is, the RF processor 2h-10 upconverts a baseband signal, provided from the baseband processor 2h-20, into an RF band signal to transmit the RF band signal through an antenna and downconverts an RF band signal, received through the antenna, into a baseband signal. For example, the RF processor 2h-10 may include a transmission filter, a reception filter, an amplifier, a mixer, an oscillator, a digital-to-analog converter (DAC), and an analog-to-digital converter (ADC). Although FIG. 2H shows only one antenna, the UE may include a plurality of antennas. In addition, the RF processor 2h-10 may include a plurality of RF chains. Further, the RF processor 2h-10 may perform beamforming. For beamforming, the RF processor 2h-10 may adjust the phase and strength of each of signals transmitted and received through a plurality of antennas or antenna elements.

The baseband processor 2h-20 performs a function of converting a baseband signal and a bit stream according to the physical-layer specification of a system. For example, in data transmission, the baseband processor 2h-20 encodes and modulates a transmission bit stream, thereby generating complex symbols. In data reception, the baseband processor 2h-20 demodulates and decodes a baseband signal, provided from the RF processor 2h-10, thereby reconstructing a reception bit stream. For example, according to OFDM, in data transmission, the baseband processor 2h-20 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processor 2h-20 divides a baseband signal, provided from the RF processor 2h-10, into OFDM symbols, reconstructs signals mapped to subcarriers through a fast Fourier transform (FFT), and reconstructs a reception bit stream through demodulation and decoding.

As described above, the baseband processor 2h-20 and the RF processor 2h-10 transmit and receive signals. Accordingly, the baseband processor 2h-20 and the RF processor 2h-10 may be referred to as a transmitter, a receiver, a transceiver, or a communication unit. At least one of the baseband processor 2h-20 and the RF processor 2h-10 may include a plurality of communication modules to support a plurality of different radio access technologies. Further, at least one of the baseband processor 2h-20 and the RF processor 2h-10 may include different communication modules for processing signals in different frequency bands. For example, the different radio access technologies may include a wireless LAN (for example, IEEE 802.11), a cellular network (for example, an LTE network), and the like. In addition, the different frequency bands may include a super high frequency (SHF) band (for example, 2.5 GHz or 5 GHz) and a millimeter wave band (for example, 60 GHz).

The storage unit 2h-30 stores data, such as a default program, an application, and configuration information for operating the UE. In particular, the storage unit 2h-30 may store information about a WLAN node performing wireless communication using a WLAN access technology. The storage unit 2h-30 provides stored data upon request from the controller 2h-40.

The controller 2h-40 controls overall operations of the UE. For example, the controller 2h-40 transmits and receives signals through the baseband processor 2h-20 and the RF processor 2h-10. Further, the controller 2h-40 records and reads data in the storage unit 2h-30. To this end, the controller 2h-40 may include at least one processor. For example, the controller 2h-40 may include a communication processor (CP) to perform control for communication and an application processor (AP) to control an upper layer, such as an application. According to the embodiment, the controller 2h-40 includes a multi-connection processor 2h-42 to perform processing for an operation in a multi-connection mode. For example, the controller 2h-40 may control the UE to perform the procedure of operations of the UE illustrated in FIG. 2E.

When random access is triggered according to configuration information indicated by a base station, the controller 2h-40 according to the embodiment may indicate the UE to perform two-step random access or four-step random access. When two-step random access is performed, the controller 2h-40 indicates the value of $N_{T4}$ to be used for transmitting a PUSCH of MsgA.

Figure 2I:
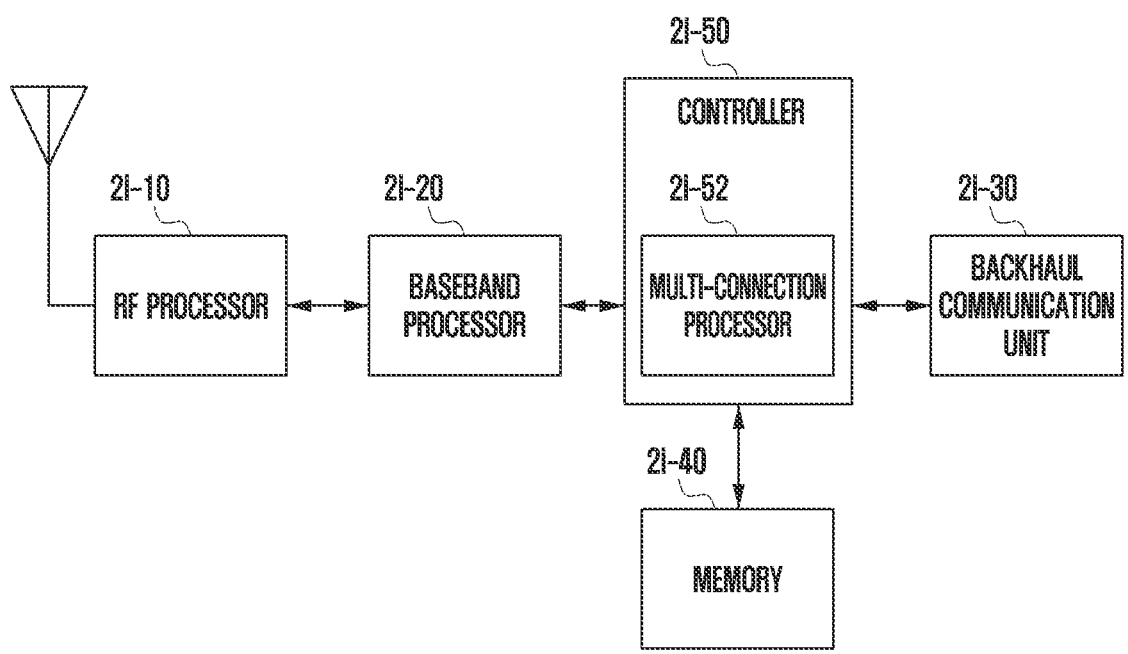
FIG. 2I is a block diagram illustrating the configuration of a base station in a wireless communication system according to an embodiment of the disclosure.

FIG. 2I is a block diagram illustrating the configuration of a base station in a wireless communication system according to an embodiment of the disclosure.

Referring to FIG. 2I, the base station includes an RF processor 2i-10, a baseband processor 2i-20, a backhaul communication unit 2i-30, a storage unit 2i-40, and a controller 2i-50.

The RF processor 2i-10 performs a function for transmitting or receiving a signal through a wireless channel, such as band conversion and amplification of a signal. That is, the RF processor 2i-10 upconverts a baseband signal, provided from the baseband processor 2i-20, into an RF band signal to transmit the RF band signal through an antenna and downconverts an RF band signal, received through the antenna, into a baseband signal. For example, the RF processor 2i-10 may include a transmission filter, a reception filter, an amplifier, a mixer, an oscillator, a DAC, and an ADC. Although FIG. 2I shows only one antenna, the base station may include a plurality of antennas. In addition, the RF processor 2i-10 may include a plurality of RF chains. Further, the RF processor 2i-10 may perform beamforming. For beamforming, the RF processor 2i-10 may adjust the phase and strength of each of signals transmitted and received through a plurality of antennas or antenna elements. The RF processor may transmit one or more layers, thereby performing downlink MIMO.

The baseband processor 2i-20 performs a function of converting a baseband signal and a bit stream according to the physical-layer specification of a first radio access technology. For example, in data transmission, the baseband processor 2i-20 encodes and modulates a transmission bit stream, thereby generating complex symbols. In data reception, the baseband processor 2i-20 demodulates and decodes a baseband signal, provided from the RF processor 2i-10, thereby reconstructing a reception bit stream. For example, according to OFDM, in data transmission, the baseband processor 2i-20 generates complex symbols by encoding and modulating a transmission bit stream, maps the complex symbols to subcarriers, and constructs OFDM symbols through an IFFT and CP insertion. In data reception, the baseband processor 2i-20 divides a baseband signal, provided from the RF processor 2i-10, into OFDM symbols, reconstructs signals mapped to subcarriers through an FFT, and reconstructs a reception bit stream through demodulation and decoding. As described above, the baseband processor 2i-20 and the RF processor 2i-10 transmit and receive signals. Accordingly, the baseband processor 2i-20 and the RF processor 2i-10 may be referred to as a transmitter, a receiver, a transceiver, a communication unit, or a wireless communication unit.

The backhaul communication unit 2i-30 provides an interface for performing communication with other nodes in a network. That is, the backhaul communication unit 2i-30 converts a bit stream, transmitted from the main base station to another node, for example, a secondary base station or a core network, into a physical signal and converts a physical signal, received from the other node, into a bit stream.

The storage unit 2i-40 stores data, such as a default program, an application, and configuration information for operating the main base station. In particular, the storage unit 2i-40 may store information on a bearer allocated to a connected UE, a measurement result reported from a connected UE, and the like. The storage unit 2i-40 provides stored data upon request from the controller 2i-50.

The controller 2i-50 controls overall operations of the main base station. For example, the controller 2i-50 transmits and receives signals through the baseband processor 2i-20 and the RF processor 2i-10 or through the backhaul communication unit 2i-30. Further, the controller 2i-50 records and reads data in the storage unit 2i-40. To this end, the controller 2i-50 may include at least one processor (e.g., multi-connection processor 2i-52).

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
    receiving, from a first base station, a radio resource control (RRC) message for reconfiguration with sync, the RRC message including first information indicating a dedicated resource for 2-step random access and second information indicating a modulation and coding scheme (MCS) for a physical uplink shared channel (PUSCH) of a message A (MsgA) for the 2-step random access, wherein the first information includes information associated with a random access preamble of the MsgA and information associated with a resource of the PUSCH of the MsgA;
    transmitting, to a second base station, the random access preamble of the MsgA on a physical random access channel (PRACH) based on the information associated with a random access preamble of the MsgA;
    transmitting, to the second base station, a payload of the MsgA on the resource of the PUSCH based on the information associated with a resource of the PUSCH of the MsgA and the second information; and
    receiving, from the second base station, message B (MsgB) as a response to the MsgA.

2. The method of claim 1,
    wherein the RRC message further includes third information indicating a time domain resource between a resource of the PRACH and the resource of the PUSCH.

3. The method of claim 1,
    wherein the 2-step random access is contention-free random access.

4. The method of claim 2, wherein transmitting the payload of the MsgA on the resource of the PUSCH is performed:
    after transmission of the random access preamble of the MsgA on the PRACH based on the third information.

5. A method performed by a first base station in a communication system, the method comprising:
    identifying first information indicating a dedicated resource for 2-step random access and second information indicating a modulation and coding scheme (MCS) for a physical uplink shared channel (PUSCH) of a message A (MsgA) for the 2-step random access, wherein the first information includes information associated with a random access preamble of the MsgA and information associated with a resource of the PUSCH of the MsgA; and
    transmitting, to a terminal, a radio resource control (RRC) message for reconfiguration with sync,
    wherein the RRC message includes the first information and the second information, and
    wherein the RRC message indicates that the terminal transmits the random access preamble of the MsgA on a physical random access channel (PRACH) to a second base station based on the information associated with a random access preamble of the MsgA, and that the terminal transmits a payload of the MsgA on the resource of the PUSCH to the second base station based on the information associated with a resource of the PUSCH of the MsgA and the second information.

6. The method of claim 5,
    wherein the RRC message further includes third information indicating a time domain resource between a resource of the PRACH and the resource of the PUSCH.

7. The method of claim 5,
    wherein the 2-step random access is contention-free random access.

8. The method of claim 6,
    wherein the payload of the MsgA is transmitted on the resource of the PUSCH after transmission of the random access preamble of the MsgA on the PRACH based on the third information.

9. A terminal in a communication system, the terminal comprising:
    a transceiver; and
    a processor configured to:
        receive, from a first base station via the transceiver, a radio resource control (RRC) message for reconfiguration with sync, the RRC message including first information indicating a dedicated resource for 2-step random access and second information indicating a modulation and coding scheme (MCS) for a physical uplink shared channel (PUSCH) of a message A (MsgA) for the 2-step random access, wherein the first information includes information associated with a random access preamble of the MsgA and information associated with a resource of the PUSCH of the MsgA, transmit, to a second base station via the transceiver, the random access preamble of the MsgA on a physical random access channel (PRACH) based on the information associated with a random access preamble of the MsgA, transmit, to the second base station via the transceiver, a payload of the MsgA on the resource of the PUSCH based on the information associated with a resource of the PUSCH of the MsgA and the second information, and receive, from the second base station via the transceiver, a message B (MsgB) as a response to the MsgA.

10. The terminal of claim 9,
wherein the RRC message further includes third information indicating a time domain resource between a resource of the PRACH and the resource of the PUSCH.

11. The terminal of claim 9,
wherein the 2-step random access is contention-free random access.

12. The terminal of claim 10, wherein the processor is configured to:
transmit, to the second base station via the transceiver, the payload of the MsgA on the resource of the PUSCH after transmission of the random access preamble of the MsgA on the PRACH based on third information.

13. A first base station in a communication system, the first base station comprising:
a transceiver; and
a processor configured to:
identify first information indicating a dedicated resource for 2-step random access and second information indicating a modulation and coding scheme (MCS) for a physical uplink shared channel (PUSCH) of a message A (MsgA) for the 2-step random access, wherein the first information includes information associated with a random access preamble of the MsgA and information associated with a resource of the PUSCH of the MsgA, and transmit, to a terminal via the transceiver, a radio resource control (RRC) message for reconfiguration with sync,
wherein the RRC message includes the first information and the second information, and
wherein the RRC message indicates that the terminal transmits the random access preamble of the MsgA on a physical random access channel (PRACH) to a second base station based on the information associated with a random access preamble of the MsgA, and that the terminal transmits a payload of the MsgA on the resource of the PUSCH to the second base station based on the information associated with a resource of the PUSCH of the MsgA and the second information.

14. The first base station of claim 13,
wherein the RRC message further includes third information indicating a time domain resource between a resource of the PRACH and the resource of the PUSCH.

15. The first base station of claim 13,
wherein the 2-step random access is contention-free random access.

16. The first base station of claim 14,
wherein the payload of the MsgA is transmitted on the resource of the PUSCH after transmission of the random access preamble of the MsgA on the PRACH based on the third information.

17. The method of claim 1,
wherein the information associated with the random access preamble of the MsgA corresponds to a synchronization signal block (SSB) associated with the second base station.

18. The method of claim 5,
wherein the information associated with the random access preamble of the MsgA corresponds to a synchronization signal block (SSB) associated with the second base station.

19. The terminal of claim 9,
wherein the information associated with the random access preamble of the MsgA corresponds to a synchronization signal block (SSB) associated with the second base station.

20. The first base station of claim 13,
wherein the information associated with the random access preamble of the MsgA corresponds to a synchronization signal block (SSB) associated with the second base station.

* * * * *